(12) United States Patent
Gurumohan et al.

(10) Patent No.: US 10,591,345 B2
(45) Date of Patent: *Mar. 17, 2020

(54) SENSOR DEVICE CONFIGURATION

(71) Applicant: Nectar, Inc., Palo Alto, CA (US)

(72) Inventors: Prabhanjan C. Gurumohan, Mountain View, CA (US); Aayush Phumbhra, Palo Alto, CA (US)

(73) Assignee: Nectar, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,988

(22) Filed: Mar. 7, 2019

(65) Prior Publication Data

US 2019/0310126 A1    Oct. 10, 2019

Related U.S. Application Data

(63) Continuation of application No. 16/012,572, filed on Jun. 19, 2018, now Pat. No. 10,267,667, which is a
(Continued)

(51) Int. Cl.
*G01F 23/296* (2006.01)
*G06Q 10/08* (2012.01)
*H04Q 9/00* (2006.01)
*G08C 17/02* (2006.01)
*A47G 19/00* (2006.01)
(Continued)

(52) U.S. Cl.
CPC ......... *G01F 23/2962* (2013.01); *A47G 19/00* (2013.01); *G06Q 10/087* (2013.01); *G08C 17/02* (2013.01); *H04B 10/114* (2013.01); *H04Q 9/00* (2013.01); *H04W 4/80* (2018.02);
(Continued)

(58) Field of Classification Search
CPC ............. G01F 23/2962; G01F 23/2961; G01F 23/2968; G06Q 10/087
See application file for complete search history.

(56) References Cited

U.S. PATENT DOCUMENTS

| | | |
|---|---|---|
| 2,804,103 A | 8/1957 | Wall |
| 4,386,409 A | 5/1983 | Petroff |
| | (Continued) | |

FOREIGN PATENT DOCUMENTS

| | | |
|---|---|---|
| CN | 101726343 A | 6/2010 |
| CN | 103815675 | 5/2014 |
| WO | 2016037612 | 3/2016 |

OTHER PUBLICATIONS

Amanda Macmillan. It's the Water Bottle of the Future—and You can Pre-Order It Now! Fitness (Flash/Fitness-Blog/) Oct. 7, 2013. http://www.self.com/flash/fitness-blog/2013/10/fitness-water-bottle-of-the-future/.
(Continued)

*Primary Examiner* — Michael J Dalbo
(74) *Attorney, Agent, or Firm* — Van Pelt, Yi & James LLP

(57) ABSTRACT

A sensor device includes an interrogation signal transmitter configured to transmit an interrogation signal to determine an identifier associated with an amount of content included in a container engaged by the sensor device. The interrogation signal transmitter is configured to transmit the interrogation signal that travels through air included in the container to reflect off the content in the container.

20 Claims, 19 Drawing Sheets

Related U.S. Application Data continuation of application No. 14/725,979, filed on May 29, 2015, now Pat. No. 10,078,003.

(60) Provisional application No. 62/093,890, filed on Dec. 18, 2014, provisional application No. 62/007,841, filed on Jun. 4, 2014.

(51) Int. Cl.
*H04B 10/114* (2013.01)
*H04W 4/80* (2018.01)

(52) U.S. Cl.
CPC ...... *G01F 23/2961* (2013.01); *G01F 23/2968* (2013.01); *H04Q 2209/43* (2013.01)

(56) References Cited

U.S. PATENT DOCUMENTS

| | | | |
|---|---|---|---|
| 4,697,200 A | 9/1987 | Miyatake | |
| 4,698,541 A | 10/1987 | Bar-Cohen | |
| 4,723,305 A | 2/1988 | Phillips | |
| 4,782,451 A | 11/1988 | Mazzarella | |
| 4,823,600 A | 4/1989 | Biegel | |
| 4,934,191 A | 6/1990 | Kroening | |
| 4,961,456 A | 10/1990 | Stembridge | |
| 5,042,698 A | 8/1991 | Fessell | |
| 5,150,334 A * | 9/1992 | Crosby | G01F 23/28 |
| | | | 367/900 |
| 5,303,585 A | 4/1994 | Lichte | |
| 5,389,848 A | 2/1995 | Trzaskos | |
| 5,471,872 A | 12/1995 | Cummings | |
| 5,603,430 A | 2/1997 | Loehrke | |
| 5,793,705 A | 8/1998 | Gazis | |
| 5,866,815 A | 2/1999 | Schwald | |
| 5,880,364 A | 3/1999 | Dam | |
| 6,272,921 B1 | 8/2001 | Ivanovich | |
| 6,545,946 B1 | 4/2003 | Huss | |
| 6,856,247 B1 | 2/2005 | Wallace | |
| 7,068,805 B2 | 6/2006 | Geddes | |
| 7,088,258 B2 | 8/2006 | Morrison | |
| 7,109,863 B2 | 9/2006 | Morrison | |
| 7,190,278 B2 | 3/2007 | Morrison | |
| 7,495,558 B2 | 2/2009 | Pope | |
| 7,573,395 B2 | 8/2009 | Morrison | |
| 7,598,883 B2 | 10/2009 | Morrison | |
| 8,061,198 B2 | 11/2011 | Yinko | |
| 8,151,596 B2 | 4/2012 | Richmond | |
| 8,284,068 B2 | 10/2012 | Johnson | |
| 8,453,878 B2 | 6/2013 | Palmquist | |
| 8,851,740 B1 | 10/2014 | Mills | |
| 9,506,798 B2 | 11/2016 | Saltzgiver | |
| 9,508,484 B2 | 11/2016 | Scholz | |
| 10,078,003 B2 * | 9/2018 | Gurumohan | A47G 19/00 |
| 10,267,667 B2 * | 4/2019 | Gurumohan | A47G 19/00 |
| 2002/0059828 A1 | 5/2002 | Muller | |
| 2003/0037613 A1 | 2/2003 | Mulrooney | |
| 2004/0169600 A1 | 9/2004 | Haynes | |
| 2005/0033532 A1 | 2/2005 | Mogadam | |
| 2005/0072226 A1 | 4/2005 | Pappas | |
| 2005/0090743 A1 | 4/2005 | Kawashima | |
| 2005/0268715 A1 | 12/2005 | Sabatino | |
| 2006/0201245 A1 | 9/2006 | Huber | |
| 2006/0231109 A1 | 10/2006 | Howell | |
| 2006/0270421 A1 | 11/2006 | Phillips | |
| 2007/0008212 A1 | 1/2007 | Serban | |
| 2007/0125162 A1 * | 6/2007 | Ghazi | G01F 1/007 |
| | | | 73/149 |
| 2007/0261487 A1 | 11/2007 | Sintes | |
| 2008/0154522 A1 | 6/2008 | Welle | |
| 2008/0250869 A1 | 10/2008 | Breed | |
| 2008/0297403 A1 | 12/2008 | Aakerstroem | |
| 2008/0314807 A1 | 12/2008 | Junghanns | |
| 2009/0093983 A1 | 4/2009 | Trafford | |
| 2009/0105969 A1 | 4/2009 | Saylor | |
| 2009/0134183 A1 | 5/2009 | Odishoo | |
| 2009/0289835 A1 | 11/2009 | Edvardsson | |
| 2010/0070208 A1 | 3/2010 | Sai | |
| 2010/0101317 A1 | 4/2010 | Ashrafzadeh | |
| 2010/0108635 A1 | 5/2010 | Horstman | |
| 2010/0200593 A1 | 8/2010 | Lazar | |
| 2010/0270257 A1 | 10/2010 | Wachman | |
| 2011/0042408 A1 | 2/2011 | Giordano | |
| 2011/0166699 A1 * | 7/2011 | Palmquist | B67D 1/1234 |
| | | | 700/236 |
| 2011/0169635 A1 | 7/2011 | Johnson | |
| 2012/0052802 A1 * | 3/2012 | Kasslin | H04W 48/12 |
| | | | 455/41.2 |
| 2012/0206155 A1 | 8/2012 | Wang | |
| 2013/0002443 A1 | 1/2013 | Breed | |
| 2013/0073218 A1 | 3/2013 | Haas | |
| 2013/0122817 A1 | 5/2013 | Pivaudran | |
| 2013/0222135 A1 | 8/2013 | Stein | |
| 2013/0313204 A1 | 11/2013 | Shalon | |
| 2014/0149265 A1 * | 5/2014 | Kundra | H04B 7/022 |
| | | | 705/28 |
| 2014/0208845 A1 * | 7/2014 | Zlotnick | G01F 22/00 |
| | | | 73/290 V |
| 2014/0324585 A1 | 10/2014 | Mederos | |
| 2014/0360270 A1 | 12/2014 | Koenig | |
| 2015/0101405 A1 | 4/2015 | Gorenflo | |
| 2015/0334079 A1 | 11/2015 | Laidlaw | |
| 2015/0355012 A1 | 12/2015 | Gurumohan | |
| 2016/0025545 A1 | 1/2016 | Saltzgiver | |
| 2016/0146659 A1 | 5/2016 | Saltzgiver | |
| 2016/0178426 A1 | 6/2016 | Gurumohan | |
| 2016/0194190 A1 | 7/2016 | Fogg | |
| 2016/0198246 A1 | 7/2016 | Gurumohan | |
| 2017/0332813 A1 | 11/2017 | Liao | |

OTHER PUBLICATIONS

Jonah Comstock. Slideshow: 8 Pillboxes that Connect to Your Phone. Mobihealth News. Mar. 13, 2013. http://mobihealthnews.com/20795/slideshow-8-pillboxes-that-connect-to-your-phone/2/.

Kreutzer et al., "Radio Frequency Identification Based Detection of Filling Levels for Automated Monitoring of Fluid Intake", Dec. 5, 2014, Proceedings of the 2014 IEEE International Conference on Robotics and Biomimetics, pp. 2049-2054.

Matthew Tait, "Smart Drink Bottle", Sep. 10, 2018, ip.com, IPCOM000255205D, pp. 1-23.

Sing et al., "A Microcontroller-based System for Liquid Level Detection Using Infrared Sensing", 2015, 2015 IEEE Student Conference on Research and Development (SCOReD), pp. 294-299.

* cited by examiner

SENSOR DEVICE CONFIGURATION

CROSS REFERENCE TO OTHER APPLICATIONS

This application is a continuation of co-pending U.S. patent application Ser. No. 16/012,572 entitled SENSOR DEVICE CONFIGURATION filed Jun. 19, 2018 which is a continuation of U.S. patent application Ser. No. 14/725,979, now U.S. Pat. No. 10,078,003 entitled SENSOR DEVICE CONFIGURATION filed May 29, 2015 which claims priority to U.S. Provisional Patent Application No. 62/007,841 entitled BEVERAGE TRACKING, REPLENISHMENT, CONSUMPTION AND INVENTORY MANAGEMENT filed Jun. 4, 2014 and claims priority to U.S. Provisional Patent Application No. 62/093,890 entitled CONTAINER FILL LEVEL MEASUREMENT AND MANAGEMENT filed Dec. 18, 2014, all of which are incorporated herein by reference for all purposes.

BACKGROUND OF THE INVENTION

Certain items such as food and beverages are often sold and stored in product containers. In many instances, an inventory of content remaining in product containers is taken to determine the number of product containers to purchase. For example, a consumer periodically performs a visual check to inventory contents remaining in food and beverage containers to identify a shopping list of items to purchase from a grocery store. In another example, bar and restaurant operators periodically inventory the amount of alcohol left in bottles to determine the amount of alcohol sold and identify quantity and type of alcohol to be purchased/replenished. The inventory of content remaining in product containers has been traditionally determined manually. This manual process is often laborious, imprecise and error prone. For example, it is often difficult for a person to visually determine an amount of liquid beverage remaining in a bottle with precision in a reliable manner. In commercial settings, the amount of time spent by an employee to manually inventory the remaining content represents a real employment cost realized by the employer. Therefore, there exists a need for a better way to determine the amount of content remaining in a container.

BRIEF DESCRIPTION OF THE DRAWINGS

Various embodiments of the invention are disclosed in the following detailed description and the accompanying drawings.

DETAILED DESCRIPTION

Figure 1:
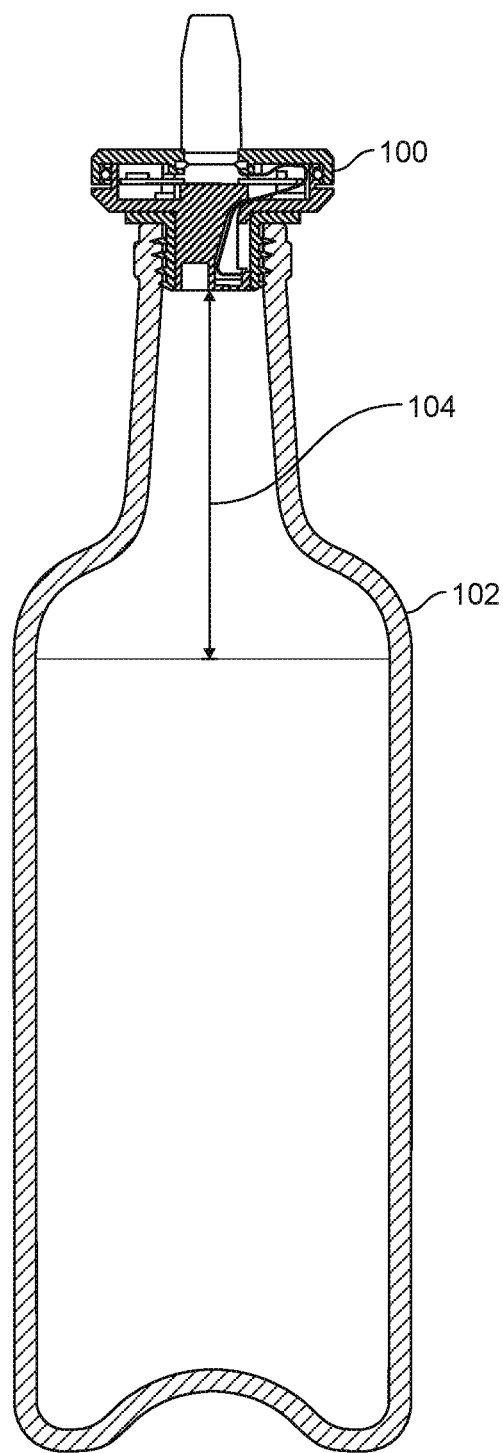
FIG. 1 is a diagram illustrating an embodiment of a fill level sensor engaged in a container.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A sensor device is disclosed. For example, the sensor device is a container cover (e.g., a bottle cap) that electronically measures an amount of liquid remaining in a container (e.g., beverage bottle) covered by the container cover. In some embodiments, the sensor device includes a content level sensor. For example, the sensor transmits an ultrasonic signal and measures the amount of time it takes for the signal to bounce off a liquid content remaining in the container and return back to the sensor to determine the liquid level remaining in the container. The sensor device includes a memory storing a container cover identifier. For example, each different sensor device is assigned a unique identifier to be able to uniquely identify each different sensor device. The sensor device includes a transmitter that transmits the sensor device identifier in response to a stimulus. For example, when a button of the sensor device is pressed, the sensor device wirelessly broadcasts the sensor device identifier. The sensor device includes a receiver that receives a sensor configuration. For example, because the sensor device may be utilized with various different types of containers, a configuration specific to the type of container that is be assigned to the sensor device is received. A user may specify the container type using an interface device and the interface device wirelessly pairs with the container cover to transmit the sensor configuration specific to the specified container type. The sensor device includes a memory that stores the received sensor configuration. The sensor configuration may be utilized by the sensor device to measure information specific to the associated container type. For example, a type of ultrasonic signal transmitted by the sensor device to measure amount of content remaining in the container is specified by the received and stored sensor configuration.

In some embodiments, a management device receives the sensor device identifier and an identification of a container type. The sensor device identifier and the identification of the container type are associated together (e.g., based on timing). For example, the identification of the container type is associated together with the first received sensor device identifier that has not been already associated. In some embodiments, sensor device identifier and the identification of the container type are associated together based on a user selection. For example, a user selects an identification of a container type for a particular sensor device.

Sensor configuration corresponding to the identified container type is retrieved and provided to the sensor device.

FIG. 1 is a diagram illustrating an embodiment of a fill level sensor engaged in a container. Container 102 is filled with a liquid. In the example shown, fill level sensor device 100 is configured as a container cover (e.g., a bottle cap with a spout). The liquid fill level of container 102 may be determined by measuring the distance between sensor device 100 and the liquid surface of container 102. As shown by line 104, a transmitter of sensor device 100 sends out a signal (e.g., ultrasonic signal) that gets reflected by the surface of the liquid. The reflected signal is detected by a receiver of sensor device 100.

By measuring the amount of time it took to receive the reflected signal, the distance traveled by the signal before being reflected (e.g., distance between sensor device 100 and liquid surface is half of the total distance traveled by the signal) may be determined by multiplying the amount of time by the speed of the signal (e.g., speed of sound).

In some embodiments, to determine the amount of time it took to receive the reflected signal, the received reflected signal is filtered to isolate the desired signal (e.g., band-pass filter the received signal), amplified, and analyzed to detect peaks that correspond to when the reflected signal was received. A predetermined beginning portion (e.g., predetermined amount of time in the beginning of the signal) of the received signal may be ignored when analyzing the signal to ignore signals that were detected due to coupling between the transmitter and receiver of sensor device 100. For example, when the transmitter transmits the signal, the signal may be received by the receiver of sensor device 100 (e.g., conducted through sensor device 100, due to undesired reflection, etc.) before the signal is reflected by the contents of the container, and the undesired received signals received in the beginning portion of the received signal are ignored when identifying the desired received reflected signal.

If the total distance between the bottom of container 102 and sensor device 100 is known, the fill height of container 102 can be determined (e.g., total distance between bottom and sensor device 100 minus distance between sensor device 100 and liquid surface). If the shape and volume of the bottle are known, the volume of liquid contained in container 102 may be determined. For example, a table/database/data structure that maps fill level (e.g., fill height, height between liquid surface and sensor device 100, etc.) to liquid volume of the container is utilized to determine liquid volume corresponding to the determined fill level. Different tables/databases/data structures may exist for different types of containers.

Sensor device 100 includes a transmitter for transmitting the reflected signal and a receiver for receiving the reflected signal. However, due to the narrow opening of container 102, the placement of the transmitter and receiver in sensor device 100 is limited to the narrow configuration of the bottle opening. If the transmitter and receiver are placed too close together, the transmitter and receiver may become coupled together. For example, the receiver may receive a strong signal from the transmitter as soon as the transmitter transmits a signal and the receiver may require a long settling time before the receiver is able to detect the desired reflected signal. If the distance between sensor device 100 and the liquid surface is small, the desired reflected signal may be received before the receiver has settled and the receiver is unable to detect the desired reflected signal. In some embodiments, the transmitter and receiver of sensor device 100 are vertically offset from each other to create a desired amount of separation distance between the transmitter and receiver. The separation distance may reduce the coupling of the transmitter and receiver and allow dampening of the transmitted signal propagated between the transmitter and the receiver through sensor device 100. However, the vertical separation of the transmitter and the receiver may create undesired reflections within the container (e.g., reflections from the neck of a bottle) that make it difficult to identify the signal reflected from the liquid surface. In some embodiments, a waveguide extending from the transmitter is utilized to direct the signal transmitted by the transmitter towards the desired direction and location to minimize undesired effects.

Figure 2A:
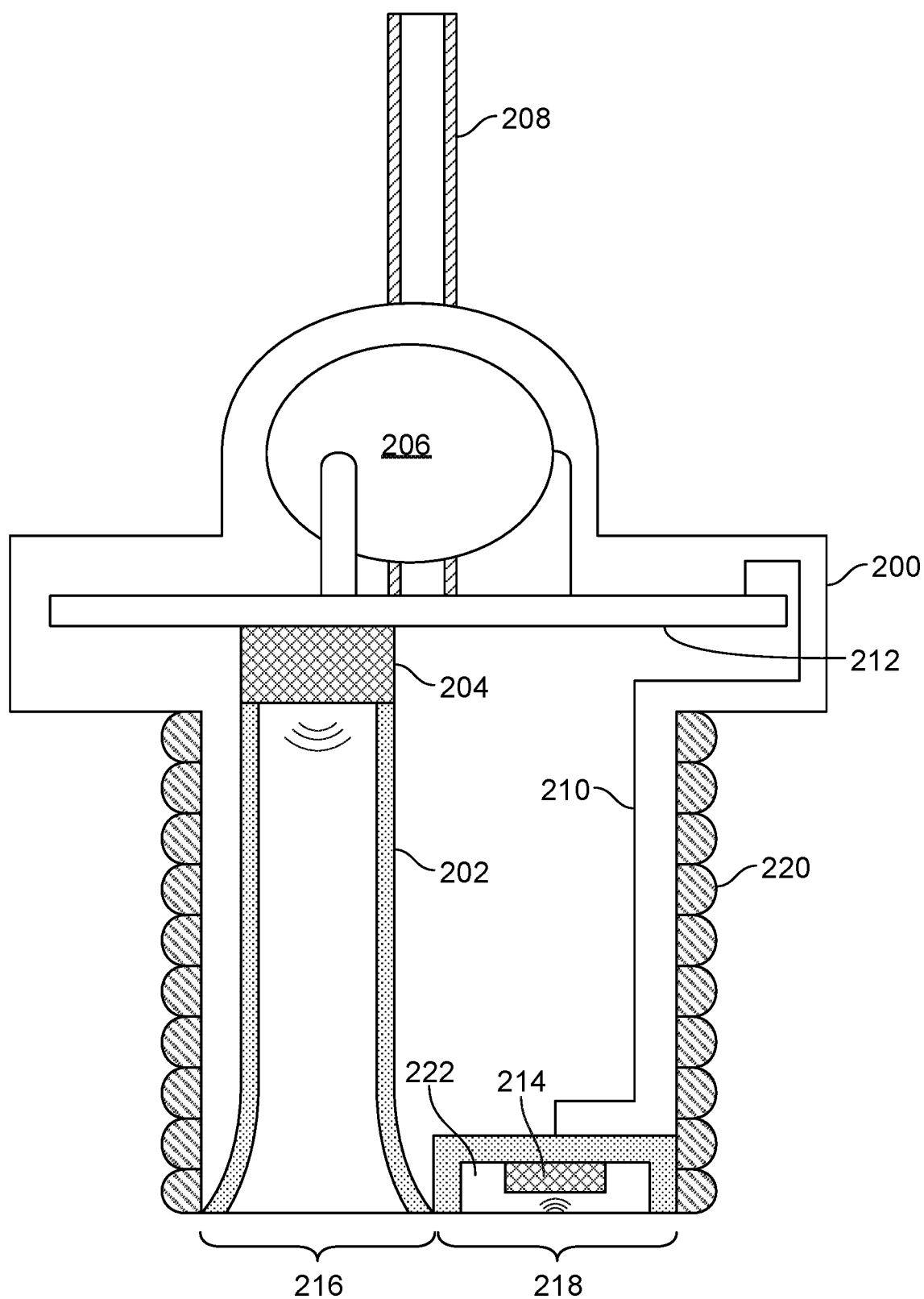
FIG. 2A is a vertical cross-sectional diagram illustrating an embodiment of a fill level sensor.
Figure 2B:
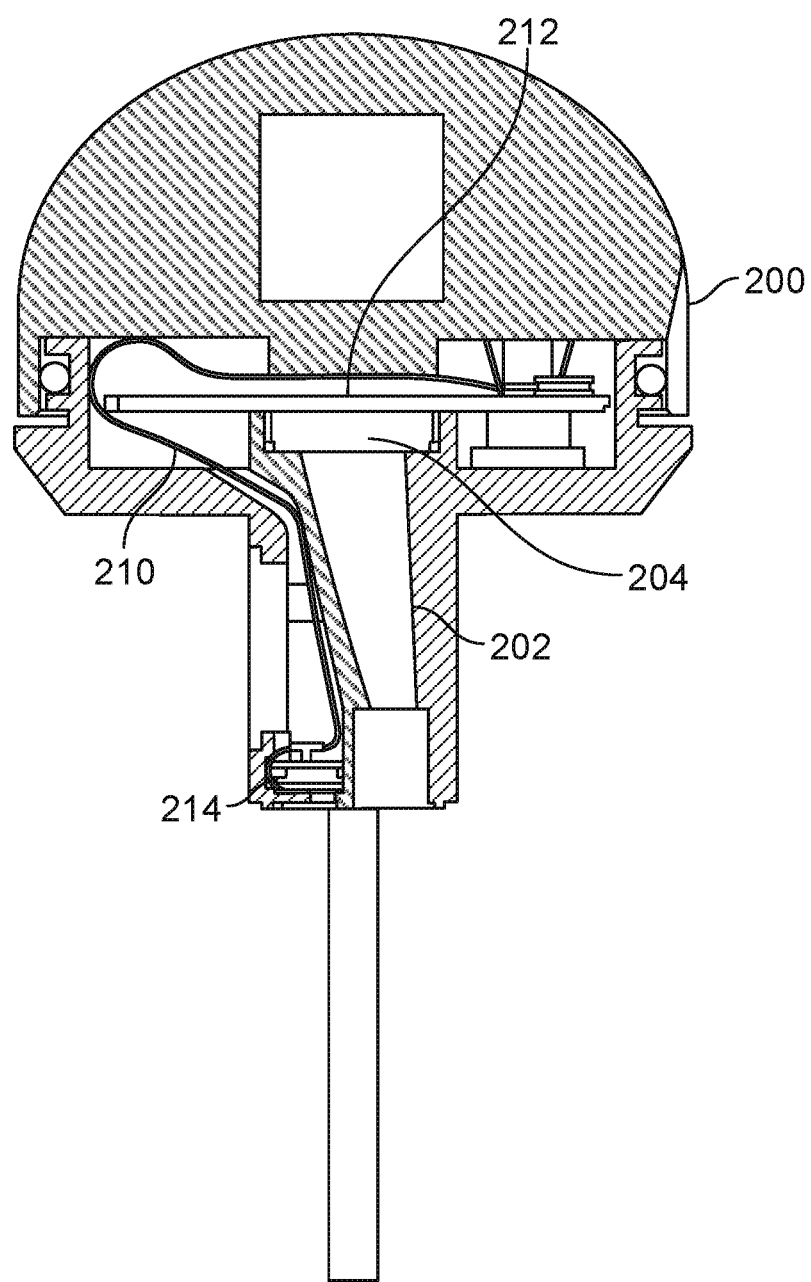
FIG. 2B is a vertical cross-sectional diagram illustrating an alternative embodiment of a fill level sensor.

FIG. 2A is a vertical cross-sectional diagram illustrating an embodiment of a fill level sensor. In some embodiments, sensor device 200 is sensor device 100 of FIG. 1. FIG. 2B is a vertical cross-sectional diagram illustrating an alternative embodiment of a fill level sensor. In the examples shown, sensor device 200 is configured as a bottle stopper with a spout. As shown in FIG. 2A, sensor device 200 includes flexible container coupling ridges 220 (e.g., rubber rings) that allows sensor device 200 to be coupled to and seal an opening of a container (e.g., as shown in FIG. 1). However, in other embodiments, sensor device 200 may be configured as a different cover of a container. For example, the components of sensor device 200 may be included in a screw-on cap or any other cap that engages a container.

Sensor device 200 includes circuit board 212. For example circuit board 212 is a printed circuit board. Circuit board 212 may connect together one or more of the following: a processor, a memory, a data storage, a connector, an integrated chip, a transmitter, a receiver, an accelerometer, a tilt sensor, a solar panel, a display, a gyroscope, a wireless data communication signal transmitter (e.g., a component able to communicate using Bluetooth, Wi-Fi, other wireless protocol, etc.), and other electrical components. For example, a processor connected to circuit board 212 provides a command to transmit an acoustic signal using a transmitter and processes a received signal to determine a fill level indicator. The fill level indicator may be transmitted wirelessly to another device such as a mobile device, a computer, a display device, or any other computing or display device using a wireless data communication transmitter. Circuit board 212 is connected to battery 206. Battery 206 provides power to the circuit of circuit board 212. Battery 206 may be rechargeable and/or replaceable. The housing of sensor device 200 may be composed of one or more materials. Examples of the materials include a food grade polymer, plastic, rubber, stainless steel, and other metals.

Sensor device 200 includes spout 208. Spout 208 is a part of a channel (e.g., tube) that allows container contents (e.g., liquid) to pass through to the tip opening of spout 208 from a bottom of sensor device 200. For example, a liquid contained in a container that is capped by sensor device 200 is able to pass through sensor device 200 and exit the opening of spout 208 when the container capped by sensor device 200 is tipped over. In some embodiments, circuit board 212 includes a hole that accommodates the channel (e.g., tube) that allows container contents (e.g., liquid) to pass through the circuit board. In other embodiments, spout 208 may not exist in sensor device 200. In some embodiments, sensor device 200 includes a vent pipe (not shown) that allows air to enter a container capped by sensor device 200 as a content of the container is poured out through spout 208. In some embodiments, sensor device 200 includes a motor (not shown) that pumps out contents of the container capped by sensor device 200.

Circuit board 212 is connected to transmitter 204. In some embodiments, transmitter 204 is an acoustic transmitter (e.g., ultrasonic signal transmitter). For example, transmitter 204 is a speaker. In some embodiments, transmitter 204 is a piezoelectric speaker. In some embodiments, transmitter 204 is configured to transmit a signal within the ultrasonic frequencies. In some embodiments, transmitter 204 is configured to transmit a signal between 20 kHz and 400 kHz, inclusive. In some embodiments, transmitter 204 is configured to transmit a 29 kHz to 40 kHz signal. In some embodiments, transmitter 204 is an acoustic impulse generator.

Receiver 214 is connected to circuit board 212 via connector 210. Examples of connector 210 include a wire, a bus, a flexible printed circuit board, and any other connector able to transmit a signal. In some embodiments, receiver 214 is an acoustic receiver (e.g., ultrasonic signal receiver). In some embodiments, receiver 214 is a microphone. In some embodiments, receiver 214 is a Micro Electro Mechanical Systems (MEMS) microphone. For example, receiver 214 is 2 millimeter×3 millimeter in size.

Waveguide 202 extends from transmitter 204. For example, waveguide 202 includes a hollow chamber (e.g., tube) that guides and propagates an acoustic signal emitted by transmitter 204 from one end of the chamber to the other end of the chamber. For example, signal emitted by transmitter 204 enters waveguide 202 at the signal input end of the hollow chamber and exits out its output end of the hollow chamber (e.g., distal end). In some embodiments, waveguide 202 aids in directing an acoustic signal (e.g., ultrasonic signal, acoustic impulse) emitted by transmitter 204 towards the direction of the distance to be measured (e.g., towards bottom of sensor device 200 that will be facing contents of a container capped by sensor device 200).

In some embodiments, it is desirable to reduce and/or attempt to eliminate any signal reflections within the chamber of waveguide 202 as the signal is guided from one end to the other end of waveguide 202. For example, any undesired reflection may mask and hinder detection of the signal reflected by container contents desired to be detected. Any sudden change in the shape of the hollow chamber may create an impedance mismatch that creates a reflection within the hollow chamber of waveguide 202. In some embodiments, the interior wall of the hollow chamber of waveguide 202 is substantially smooth to prevent impedance mismatches. In some embodiments, a shape and/or size of a horizontal cross section of waveguide 202 does not change by more than one percent per millimeter of vertical distance between the signal input end closest to transmitter 204 to the other signal output end (e.g., distal end). In some embodiments, a shape of the opening of one end of the hollow chamber is different from a shape of the opening of the other end of the hollow chamber. For example, a shape of an opening of the transmitter may be different than a desired shape of the signal output end of waveguide 202 (e.g., desired shape to improve directionality of the signal in container). In one example, the signal input end of the chamber of waveguide 202 is shaped in a first shape (e.g., elliptical shape) and the output opening end of the other end of the chamber of waveguide 202 is shaped in a second shape (e.g., circular shape). The change in horizontal cross-sectional shape of the hollow signal propagation chamber may gradually morph from the first shape to the second shape across the vertical length of waveguide 202. For example, the minor axis of the elliptical shape signal input opening gradually is expanded (e.g., flair out smoothly) to generally match the major axis of the elliptical shape in the output end of waveguide 202.

In some embodiments, a cross-sectional area of a signal output opening of the chamber of waveguide 202 is at least as large as a cross-sectional area of a signal input opening of the other end of the chamber of waveguide 202 that receives the signal from transmitter 204. For example, the cross-sectional area of the signal output opening of waveguide 202 is substantially equal to the cross-sectional area of the signal input opening in one embodiment. In another example, the cross-sectional area of the signal output opening of waveguide 202 is greater than the cross-sectional area of the signal input opening.

In some embodiments, the horizontal cross-sectional area of the hollow chamber of waveguide 202 is only greater or equal to a previous horizontal cross-sectional area of the hollow chamber from the input opening to the output opening of waveguide 202. For example, in order to ensure that the amplitude of an acoustic signal outputted by transmitter 204 is maintained as much as possible, the cross-sectional area of the chamber of waveguide 202 never decreases as the acoustic signal is traveling down the chamber of waveguide 202. In some embodiments, the horizontal cross-sectional area of the chamber of waveguide 202 is generally increasing as the signal emitted by transmitter 204 travels down waveguide 202 towards the distal end of waveguide 202.

In some embodiments, the interior hollow chamber of waveguide 202 is coated with a dampening material. For example, an acoustic signal dampening material (e.g., rubber like material) coats plastic walls of the hollow chamber and the coating may assist in reducing the amount of signal that gets transferred to receiver 214 from the portion of the signal that impacts the walls of the hollow chamber. In some embodiments, an interior chamber of waveguide 202 is filled with an acoustically permeable material. In some embodiments, an open end of waveguide 202 is touching transmitter 204. For example, a rubberized end of waveguide 202 seals signals emitted by transmitter 204 within an air chamber of waveguide 202. In some embodiments, a size of a signal input opening of waveguide 202 near transmitter 204 is at least as large as a transmitter opening of transmitter 204. For example, transmitter 204 includes an opening where an acoustic signal is outputted (e.g., speaker grill opening) and the opening of the transmitter is positioned within the signal input opening of waveguide 202 that is at least as large. In some embodiments, a shape and size of a signal input opening of waveguide 202 near transmitter 204 is substantially the same as a transmitter opening of transmitter 204. In some embodiments, waveguide 202 is attached to transmitter 204. For example, transmitter 204 and waveguide 202 are attached together by glue. In some embodiments, waveguide 202 is mechanically coupled to transmitter 204.

In some embodiments, a height of waveguide 202 (e.g., distance between the input and output openings) is approximately 20 millimeters. In some embodiments, a height of waveguide 202 (e.g., distance between the input and output openings) is approximately less than or equal to 0.1 millimeters. In some embodiments, a height of waveguide 202 (e.g., distance between the input and output openings) is approximately less than or equal to 60 millimeters. In some embodiments, widths of a hollow chamber of waveguide 202 (e.g., horizontal cross-sectional area) is approximately less than or equal to 12 millimeters. In various embodiments, the shape, length, and width of waveguide 202 may be any combination of shape, length and width configurations and sizes.

In some embodiments, waveguide 202 is attached to receiver chamber 222 of receiver 214. For example as shown, receiver 214 is recessed in the receiver chamber 222 area that is included/attached to the side of waveguide 202. Waveguide 202 and receiver chamber 222 may be composed of the same or different materials. Examples of the materials include a food grade polymer, plastic, rubber, stainless steel, and other metals. In some embodiments, waveguide 202 is not attached to receiver chamber 222. For example, receiver chamber 222 is attached to the housing of sensor device 200 and not directly attached to waveguide 202.

In some embodiments, a placement distance (e.g., vertical distance) between transmitter 204 and receiver 214 is at least 0.6 millimeters. For example, by vertically offsetting the transmitter 204 and receiver 214, signal coupling between transmitter 204 and receiver 214 through materials of sensor device 200 is reduced and allows better detection of a desired reflected signal received by receiver 214. In some embodiments, at least a portion of transmitter 204 horizontally overlaps receiver 214 in the horizontal position. For example, due to their vertical offset, transmitter 204 is able to horizontally overlap receiver 214 (e.g., at least a portion of width of transmitter 204 overlaps at least a portion of width of receiver 214). In some embodiments, the signal output opening of waveguide 202 is substantially on the same vertical location as the opening of receiver chamber 222. For example, by placing the signal output opening of waveguide 202 on the same vertical location as the opening of receiver chamber 222, an effect of a signal reflection caused by the impedance mismatch of the output opening of waveguide 202 on the detection of a desired received reflected signal is minimized. In some embodiments, the signal output opening of waveguide 202 is parallel to the opening of receiver chamber 222.

In some embodiments, because debris, liquid, and other materials may enter the chamber of waveguide 202 and receiver chamber 222 (e.g., when using spout 208 to pour out contents of the container), the chamber of waveguide 202 and receiver chamber 222 are protected (e.g., to protect transmitter 204 and receiver 214). In some embodiments, a protective layer material covers the output opening of waveguide 202 and the opening of receiver chamber 222. Ideally the protective material must not allow undesired material through to the chambers while at the same time allowing signals (e.g., acoustic signals) to pass through. Protective material 216 covers the output opening of waveguide 202 and is attached to the opening edges of waveguide 202. Protective material 218 covers the output opening of receiver chamber 222 and is attached to the opening edges of receiver chamber 222. In some embodiments, protective material 216 and protective material 218 are the same continuous material. For example, a single connected sheet includes both protective material 216 and protective material 218. In some embodiments, protective material 216 and protective material 218 are not continuous materials. For example, in order to maximize decoupling of the transmitted signal of transmitter 204 and the received signal of receiver 214, protective material 216 and protective material 218 are not made of the same continuous material. In some embodiments, protective material 216 and protective material 218 are different materials. Examples of protective material 216 and protective material 218 include one or more of the following: Mylar sheet, waterproof mesh, acoustic sheet, Teflon, Gortek, and any other appropriate mesh or membrane. For example, a Mylar sheet covering does not allow liquid to pass through while acting like a drum to allow acoustic signals to pass through. In some embodiments, protective material 216 and/or protective material 218 are acoustically transmissive liquid blocking materials. In some embodiments, protective material 216 and/or protective material 218 is optional.

In an alternative embodiment, rather than utilizing a separate transmitter and a separate receiver, a transceiver that acts as both a receiver and transmitter is utilized. For example, receiver 214 is not utilized and transmitter 204 is a transceiver (e.g., piezoelectric transceiver).

Figure 3A:
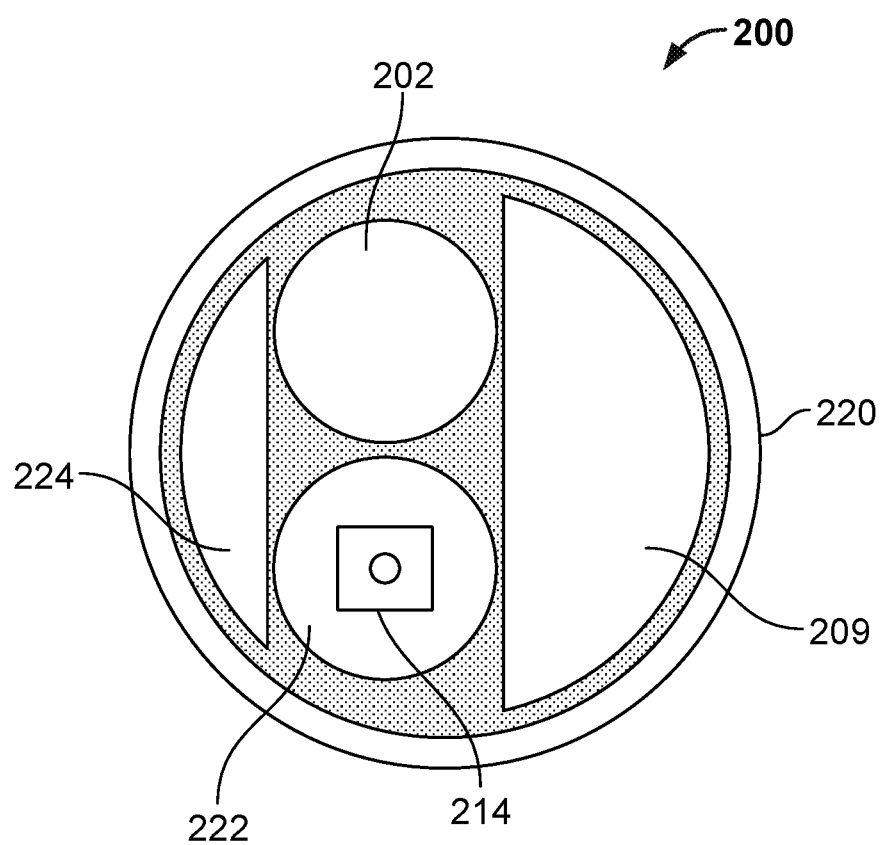
FIGS. 3A-3B are bottom view diagrams illustrating embodiments of a fill level sensor.
Figure 3B:
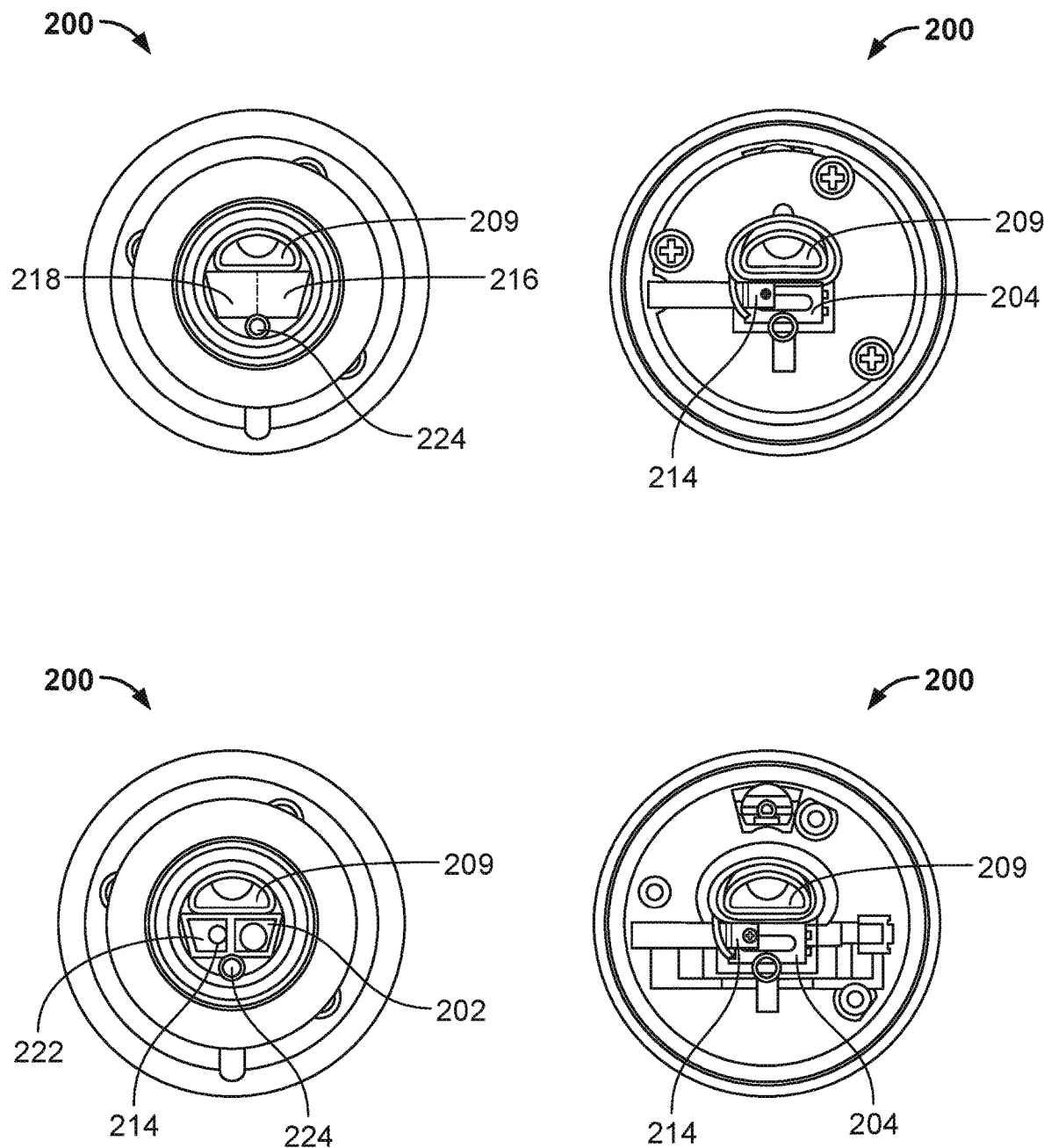

FIGS. 3A-3B are bottom view diagrams illustrating embodiments of a fill level sensor. Sensor device 200 is sensor device 200 of FIG. 2A or 2B. Sensor device 200 includes flexible ridges 220 (e.g., rubber rings) that allows sensor device 200 to be coupled to and seal an opening of a container (e.g., as shown in FIG. 1 and FIG. 2A). Spout input opening 209 allows contents (e.g., liquid contents of a container capped by sensor device 200) that enter through spout input opening 209 to be channeled and outputted through spout 208 (shown in FIG. 2A). The signal output end of waveguide 202 is shown in FIGS. 3A and 3B. Receiver 214 is recessed inside receiver chamber 222. In some embodiments, protective material 216 covers the shown output opening of waveguide 202 and is attached to the opening edges of waveguide 202. In some embodiments, protective material 218 covers the shown output opening of receiver chamber 222 and is attached to the opening edges of receiver chamber 222. Vent output opening 224 (e.g., opening of a vent pipe) allows air to enter a container capped by sensor device 200 as contents of the container is poured out through spout input opening 209. In order to show the internal components of various embodiments of sensor device 200, one or more components of sensor device 200 are not shown in FIGS. 3A-3B.

Figure 4A:
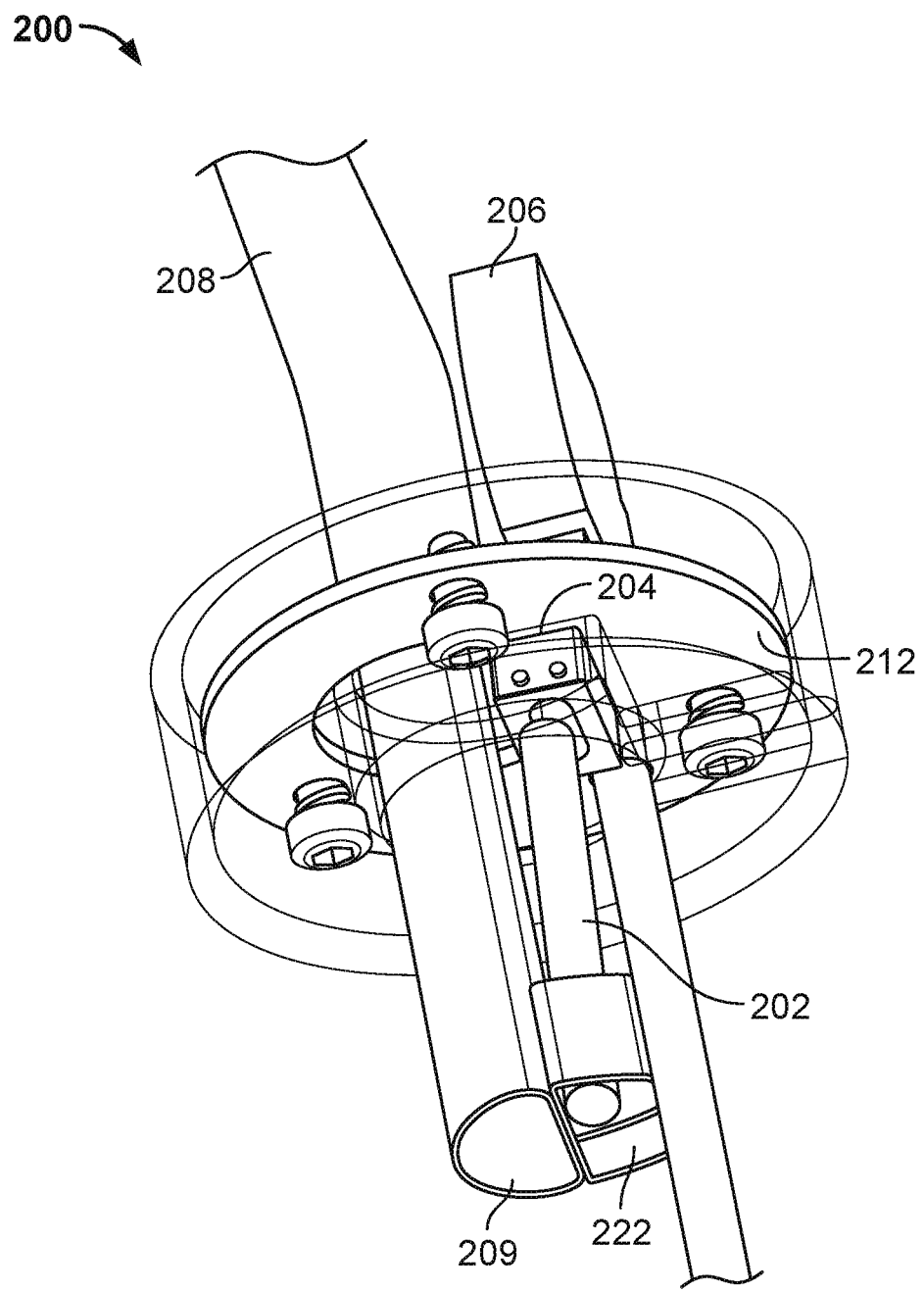
FIGS. 4A-4C are profile diagrams illustrating embodiments of a fill level sensor.
Figure 4B:
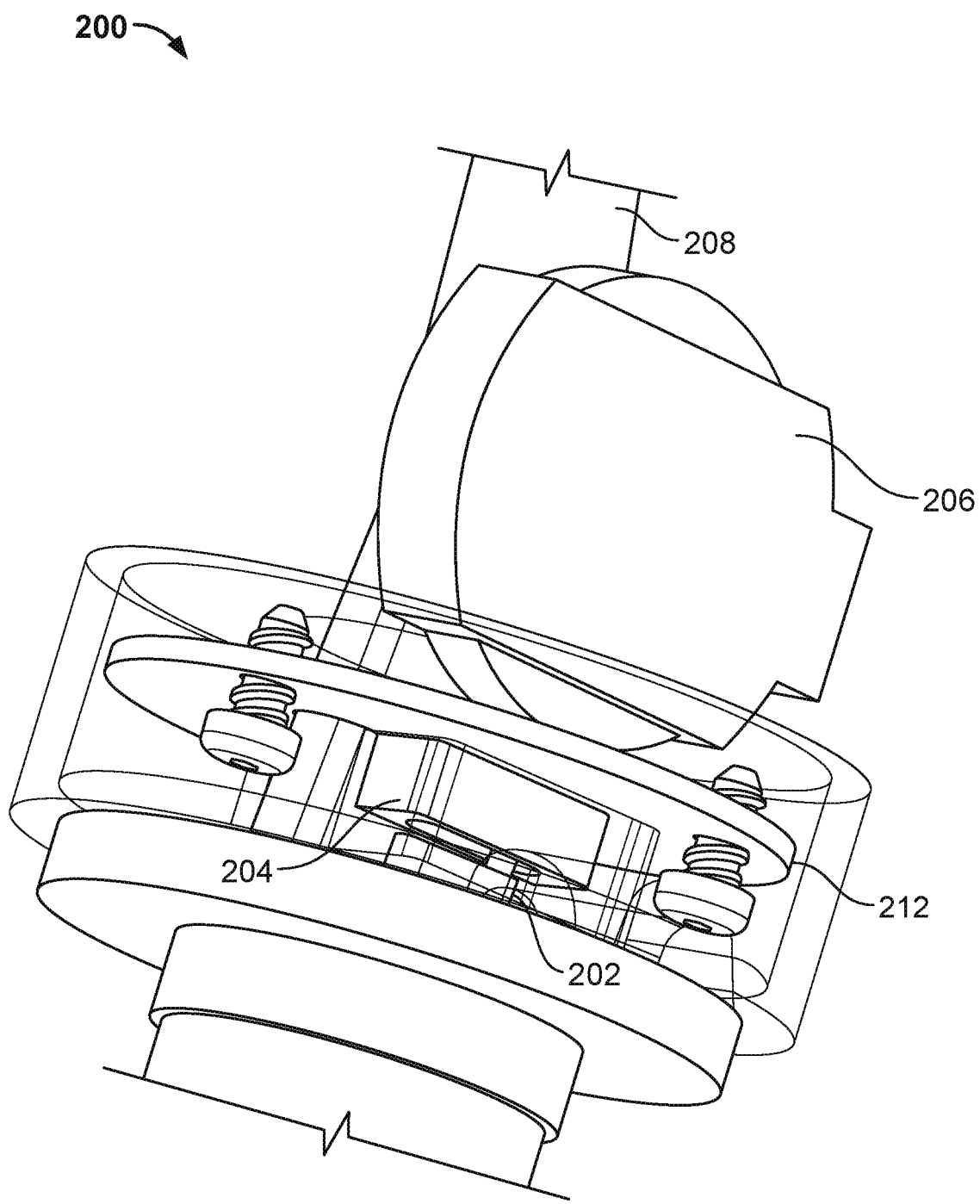
Figure 4C:
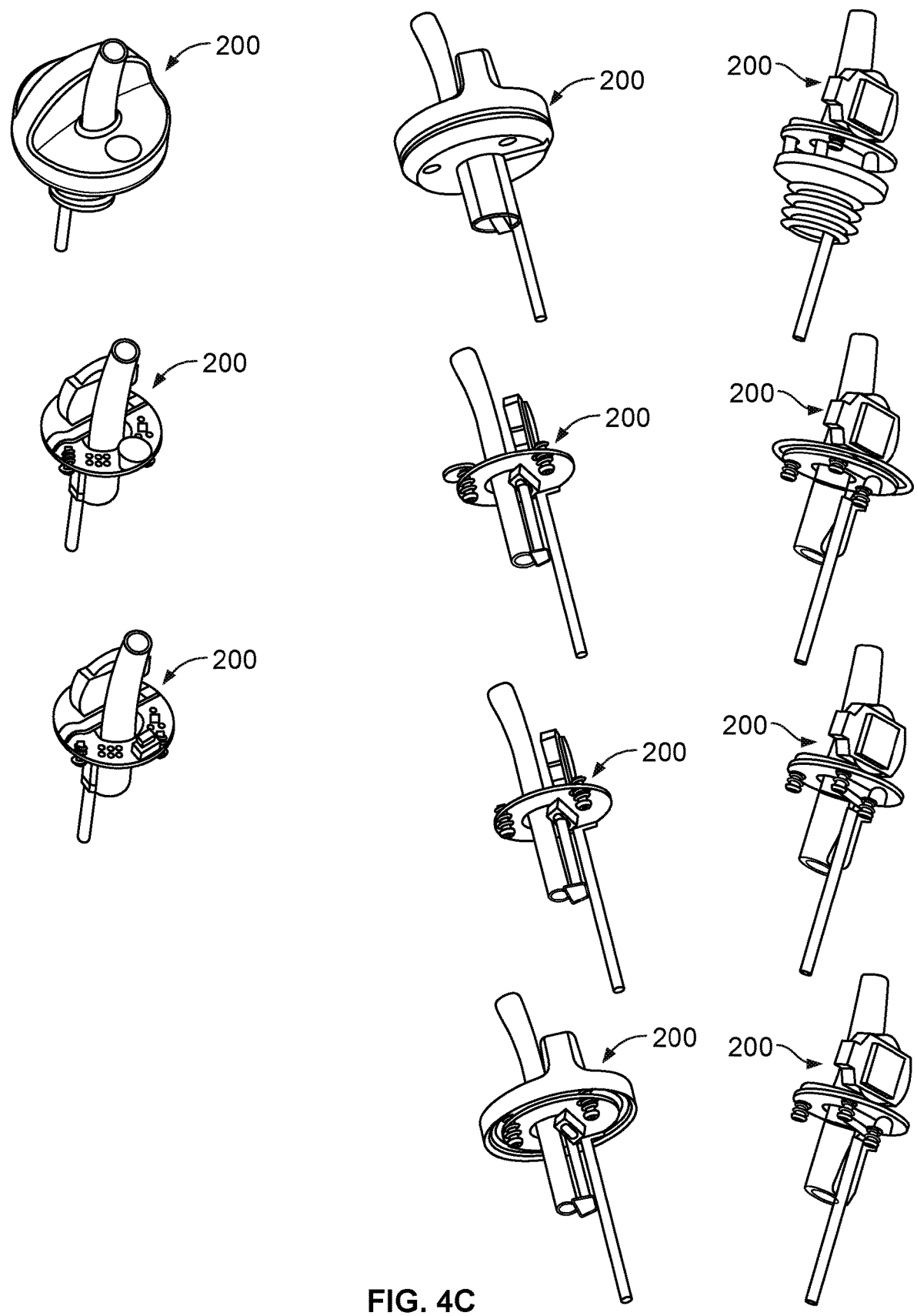

FIGS. 4A-4C are profile diagrams illustrating embodiments of a fill level sensor. The diagrams show various external and internal components of various embodiments of fill level sensor device 200. In order to show the internal components of various embodiments of sensor device 200, one or more components of sensor device 200 are not shown in FIGS. 4A-4C.

Figure 5:
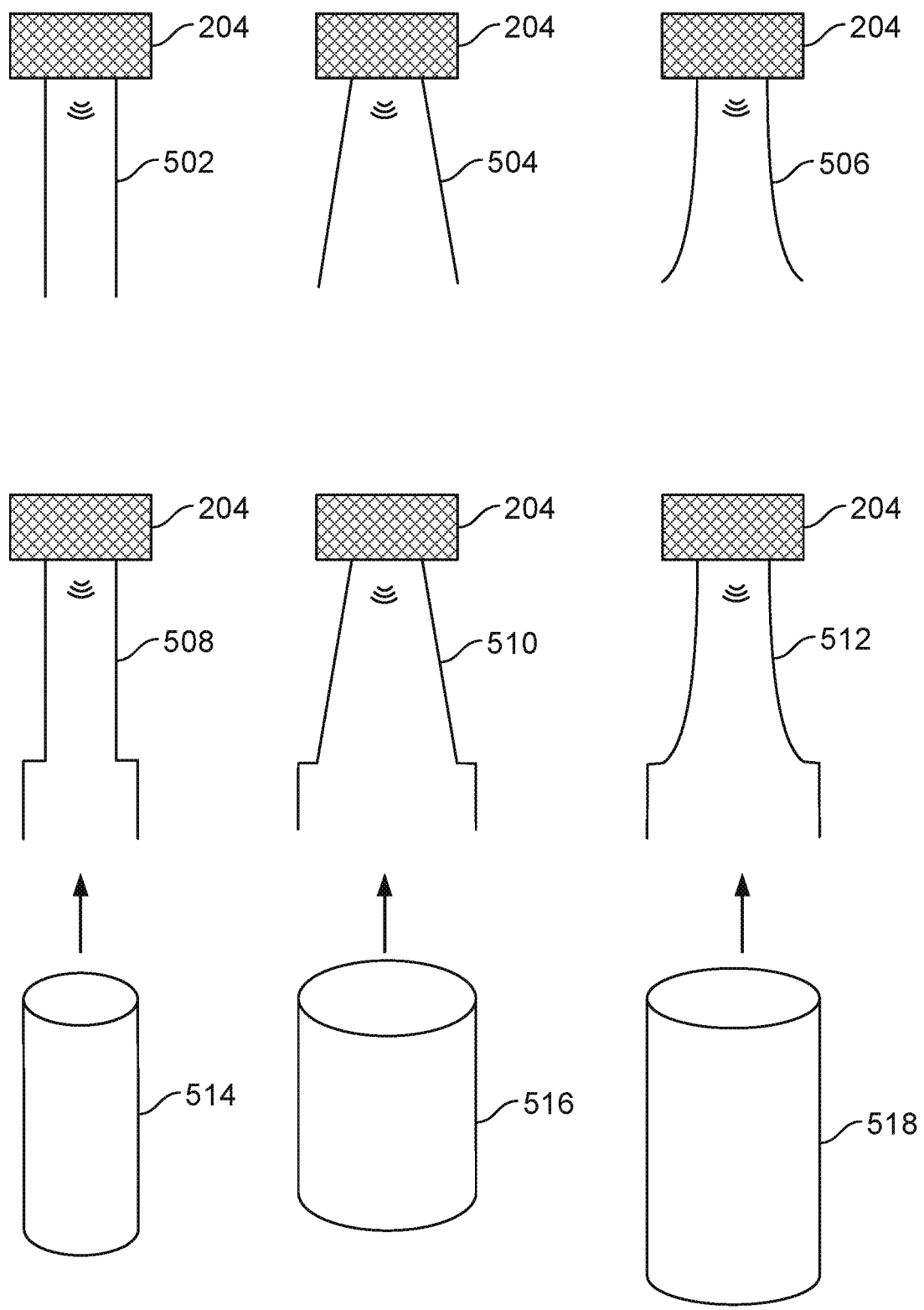
FIG. 5 is a diagram showing alternative embodiments of a waveguide.

FIG. 5 is a diagram showing alternative embodiments of a waveguide. In some embodiments, FIG. 5 shows alternative shapes of waveguide 202 shown in FIGS. 2A, 2B, 3A, 3B, 4A, and 4B.

Waveguides 502-512 show vertical cross-sectional diagrams of different embodiments of waveguide shapes. For example, although waveguides 502-512 are tubular in shape, the cross-sectional diagrams are shown to illustrate the hollow interior of the waveguides. Waveguide 502 includes substantially straight side walls that extend straight from the signal input end of waveguide 502 that receives signal input from transmitter 204 to the signal output end of waveguide 502. Waveguide 504 includes linearly sloped side walls that extend smoothly outward from signal input end of waveguide 504 that receives signal input from transmitter 204 to the signal output end of waveguide 504. Waveguide 506 includes exponentially sloped side walls that extend smoothly outward from the signal input end of waveguide 506 that receives signal input from transmitter 204 to the signal output end of waveguide 506.

In some embodiments, the output end of a waveguide is configured to accommodate a waveguide extension tube (e.g., tube with two open ends). For example, for certain types of containers, it may be beneficial to guide a signal outputted by transmitter 204 further down in to the container to measure fill level. By utilizing a waveguide extension tube, a waveguide is able to extend beyond the sensor device 200. By extending the waveguide further down the container, undesired reflection in the container may be minimized. In some embodiments, the output end of the waveguide is enlarged to accommodate coupling with a waveguide extension tube. For example, in order to minimize the impedance mismatch between the output end of a waveguide with the input end of the waveguide extension tube to be coupled, the transition between the interior output opening of the sensor waveguide and interior input opening of the extension tube must be smooth. In some embodiments, the interior opening widths of waveguide extension tubes 514, 516 and 518 are substantially similar to interior opening widths of waveguides 508, 510, and 512, respectively.

Waveguide extension tubes 514, 516 and 518 are shown in profile view. Although waveguide extension tubes 514, 516 and 518 are shown separated from waveguides 508, 510, and 512, respectively, to show the different components, waveguide extension tubes 514, 516 and 518 may be inserted into waveguides 508, 510, and 512, respectively, to be coupled (e.g., friction coupling, mechanical coupling, etc.) together. To accommodate for the thickness of the waveguide extension tube, waveguides 508, 510, and 512 include bell shaped ends that can be coupled with waveguide extension tubes 514, 516, and 518, respectively to create a relatively smooth transition between the interior walls of the sensor waveguides and the waveguide extension tubes. In some embodiments, a waveguide extension tube is removable from a sensor waveguide. In some embodiments, a waveguide extension tube is permanently coupled (e.g., glued) to a sensor waveguide. Examples of the materials that make up waveguide extension tubes 514, 516, and 518 include a food grade polymer, plastic, rubber, stainless steel, and other metals.

Figure 6:
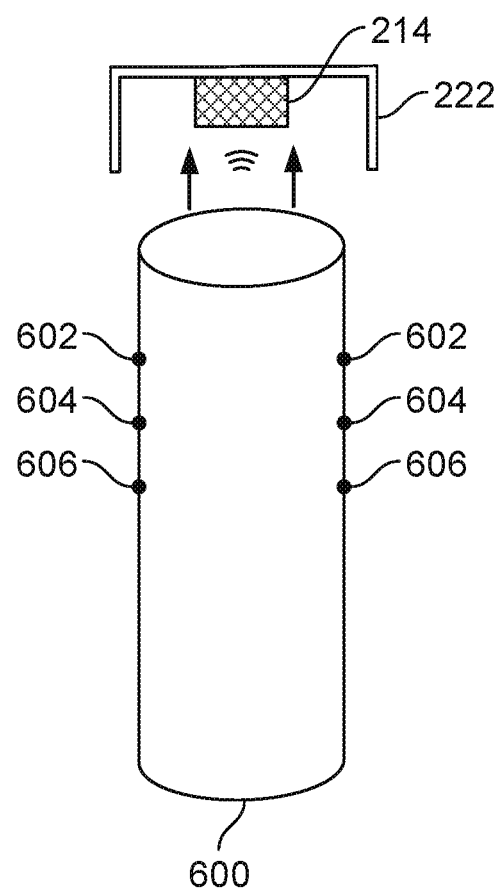
FIG. 6 is a diagram showing a receiver extension tube.

FIG. 6 is a diagram showing a receiver extension tube. In some embodiments, FIG. 6 shows an embodiment of receiver 214 and receiver chamber 222 of sensor device 200 shown in FIGS. 2A, 3A, and 3B. Receiver 214 and receiver chamber 222 are shown in cross sectional view and receiver extension tube 600 is shown in profile view. Although receiver extension tube 600 is shown separated from receiver chamber 222 to show the different components, receiver extension tube 600 may be inserted into receiver chamber 222 to be coupled together. By utilizing a receiver extension tube, a receiver chamber is able to extend beyond the sensor device 200.

In some embodiments, the output end of receiver chamber 222 is configured to accommodate receiver extension tube 600 (e.g., tube with at least two open ends). For example, for certain types of containers, it may be beneficial to receive a signal outputted by transmitter 204 further down in to the container within receiver extension tube 600. By extending further down the container the receiver chamber that will guide a received signal to receiver 214, undesired reflection in the container may be rejected from entering the extended receiver chamber. Receiver chamber 222 is configured to accommodate coupling (e.g., friction coupling, mechanical coupling, etc.) with receiver extension tube 600. The size of receiver chamber 222 is large enough to accommodate for the thickness of receiver extension tube 600. In some embodiments, a receiver extension tube is removable from receiver chamber 222. In some embodiments, receiver extension tube 600 is permanently coupled (e.g., glued) to receiver chamber 222. In some embodiments, at least one end of receiver extension tube 600 is sealed with an acoustically transmissive liquid blocking material (e.g., material 218 of FIG. 2A and FIG. 3B). The lengths, widths, and/or shape of receiver extension tube 600 may vary across different embodiments. Examples of the materials that make up receiver extension tube 600 include a food grade polymer, plastic, rubber, stainless steel, and other metals. In some embodiments, the interior opening width of receiver extension tube 600 is at least as large as a size of an opening of receiver 214 that is configured to receive a signal.

In the example shown, receiver extension tube 600 includes optional pairs of holes/slots 602, 604, and 606. Each hole of each pair is on the same horizontal axis position (e.g., vertical position) substantially opposite one another on receiver extension tube 600. Although three pairs have been shown, any number of pairs may exist in other embodiments. In some embodiments, pairs of holes/slots 602, 604, and 606 allow receiver 214 to act as a shotgun/parabolic microphone. For example, receiver 214 is able to directionally better detect signals received at the bottom of receiver extension tube 600 rather than the sides of extension tube 600. Signals received at the sides of receiver extension tube 600 (e.g., received through holes/slots 602, 604, and 606) may be largely cancelled out (e.g., signal waves are cancelled as signal is received through each opposite hole/slot of each hole/slot pair). In some embodiments, pairs of holes/slots 602, 604, and 606 are sealed with an acoustically transmissive liquid blocking material (e.g., material 218 of FIG. 2A and FIG. 3B).

Figure 7A:
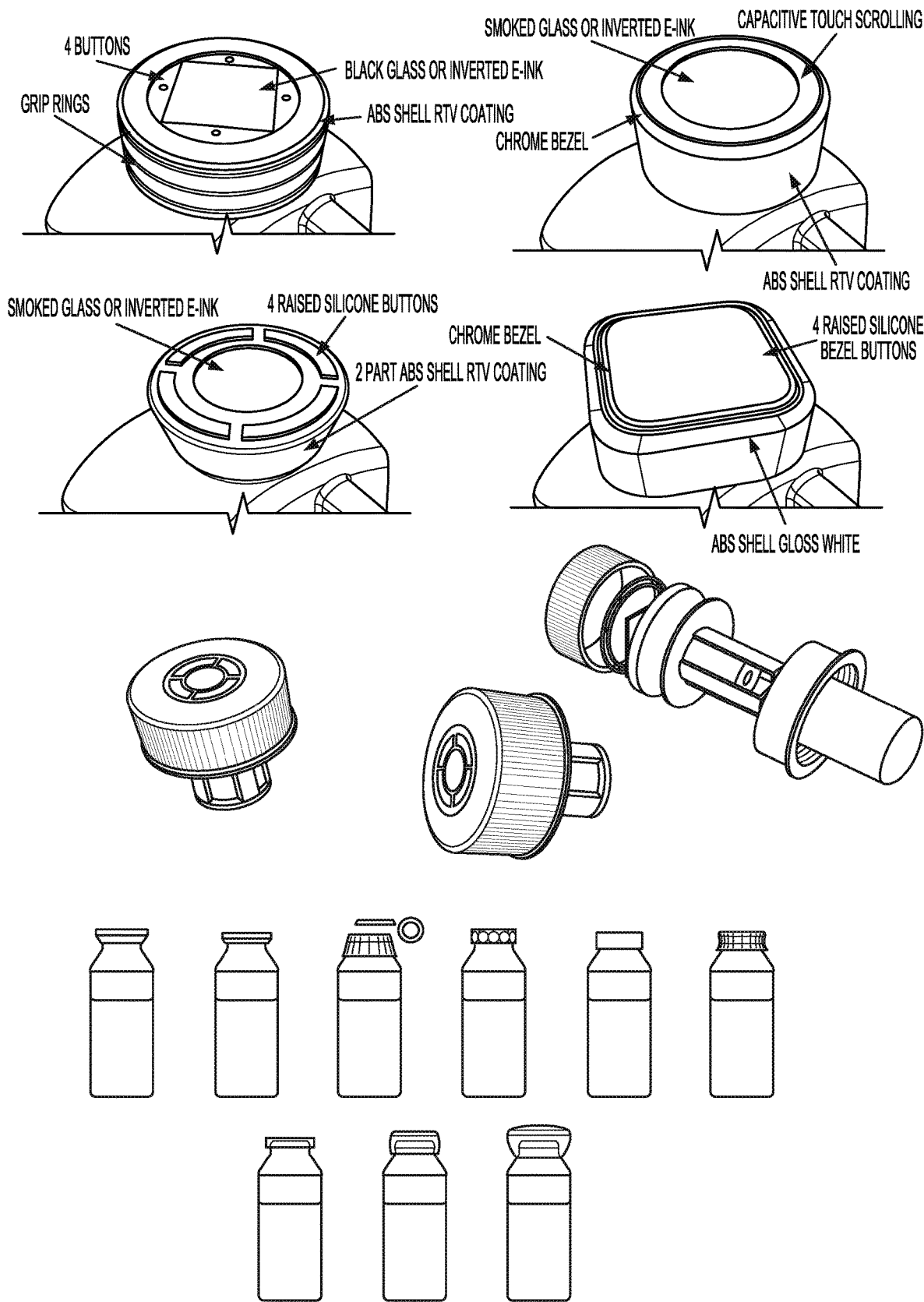
FIGS. 7A-7C show various container covers that may be similarly configured to include one or more of the components shown in other figures.
Figure 7B:
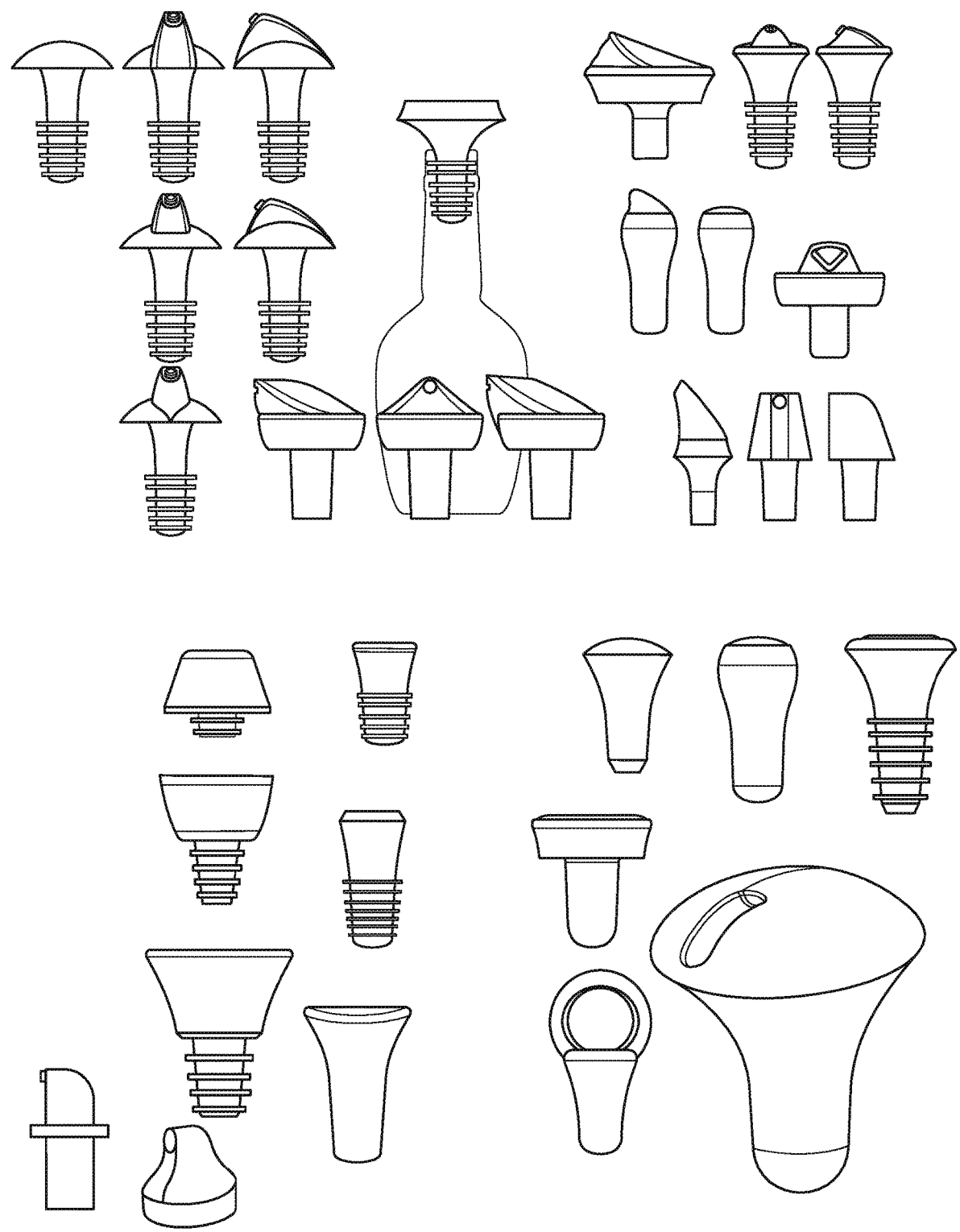
Figure 7C:
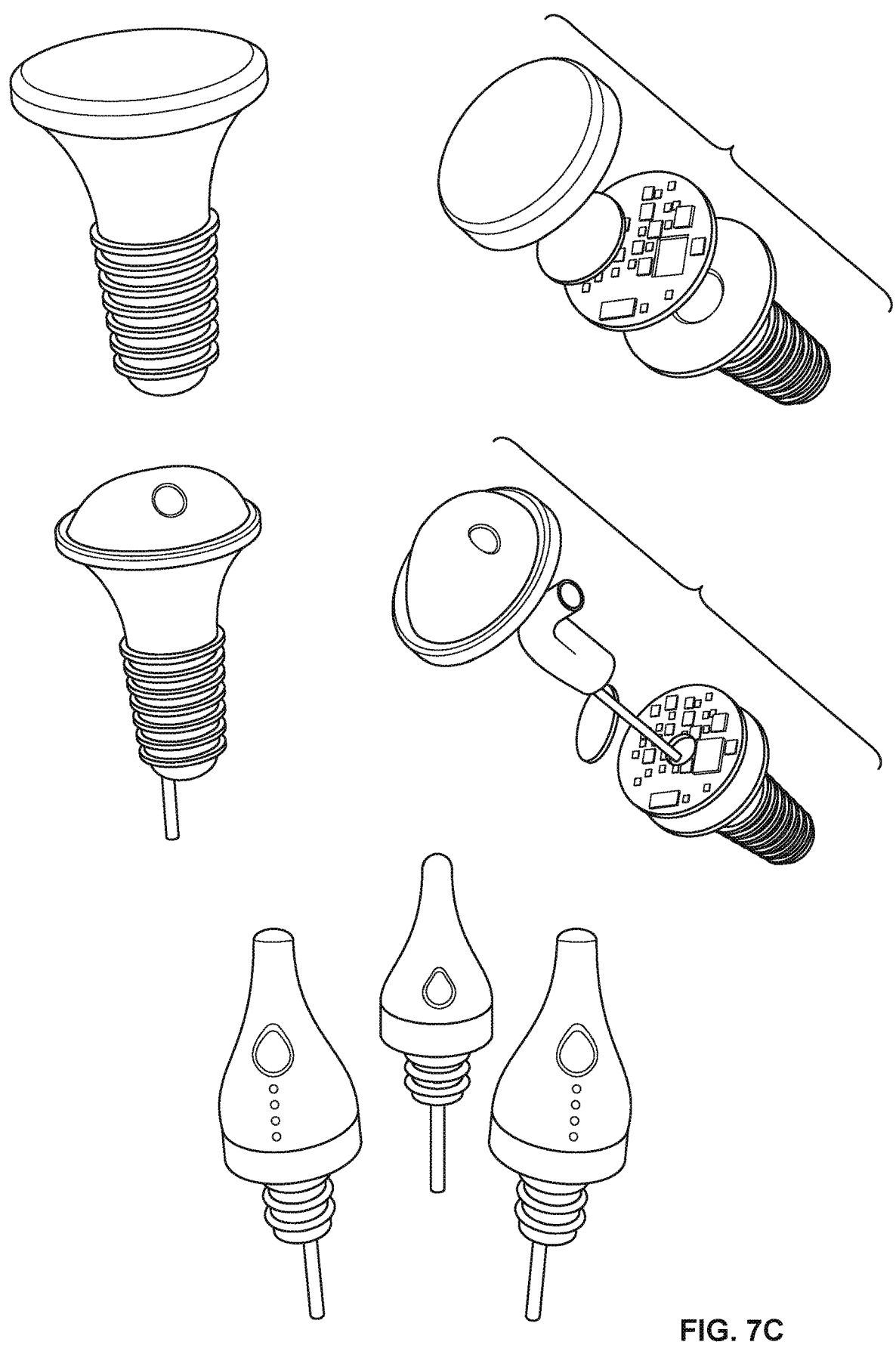

The example container cap shape of fill level sensors (e.g., sensor device 200) shown in the Figures is merely illustrative. One or more of the internal components shown in FIGS. 2A-6 may be configured and included similarly in different types of container covers/caps. FIGS. 7A-7C show various container covers that may be similarly configured to include one or more of the components shown in other figures.

Figure 8:
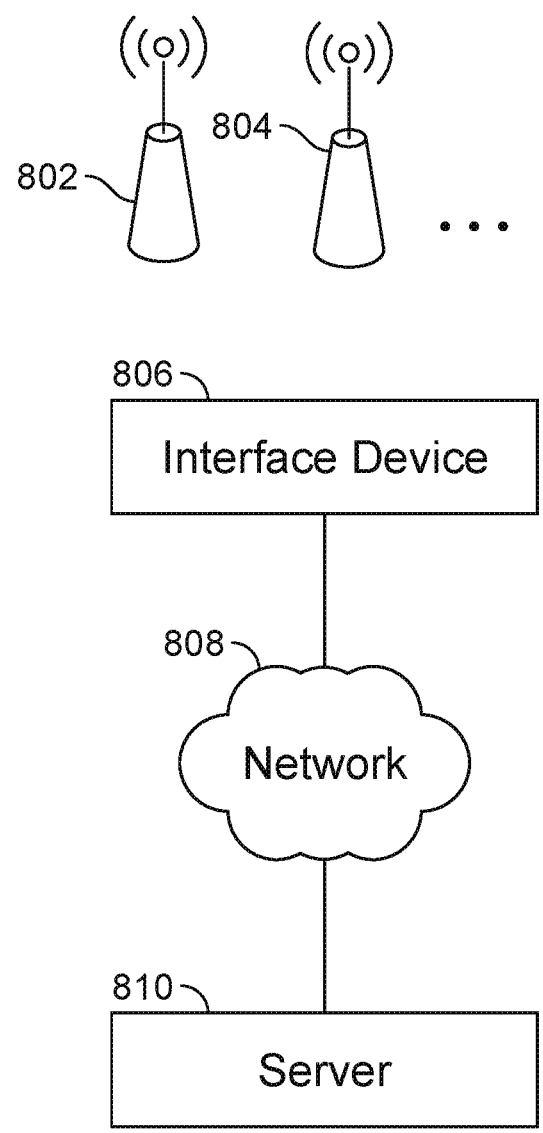
FIG. 8 is a block diagram illustrating an embodiment of a system for an automated container content management environment.

FIG. 8 is a block diagram illustrating an embodiment of a system for an automated container content management environment.

Sensor devices 802 and 804 each include a sensor for automatically determining the amount of content remaining in a container covered by the sensor device. In some embodiments, sensor devices 802 and 804 each include sensor device 100 and/or 200 of FIGS. 1-7C. Although only two sensor devices have been shown in FIG. 8, any number of sensor devices may exist in various embodiments. Examples of sensor devices 802 and 804 include a bottle cap, a bottle cap with a spout, a container lid, and any other container cover configured to cover at least a portion of an opening of a container.

In some embodiments, the sensor devices utilize one or more of the following to detect remaining content amount/level of content in a container and/or a volume of flow outputted from the container: ultrasound, sonar, inductive, capacitive, IR, line, video sensors, etc.

In various embodiments, sensor device 802 and/or sensor device 804 includes one or more of the following features:
- a threading or another portion utilized as an inductive sensor
- detection of content expiration by sensing the chemical composition and nutrient value using humidity, barometry, light, pH, and/or odor sensors
- input mechanism to receive an identification of a classification of a food type (e.g., tequila, rum, 5% ale, etc.)
- a temperature sensor and notification mechanism to notify a user if the temperature is not optimal
- a click wheel input mechanism based on mechanical and/or electrical components (e.g., capacitive sensor)
- a display configured to display quantity, expiration date, type of product, nutrient information, temperature, last used information, etc.
- a wireless radio to identify and connect to a wireless network (e.g., Bluetooth, WiFi, etc.)
- detect motion using an accelerometer to allow automatic power on/off on an as needed basis to optimize power consumption (e.g., an optimal power management algorithm to store, manage, and transmit the information to minimize power usage)
- a touch sensitive screen that provides an interface for placing an order
- impellers, flow restrictive mechanisms, or any conduit utilized in pouring content out of a container
- a mechanical fixture that allows quantity measurement while enclosed in a casing that insulates and protects the electrical system from all forms of liquids (e.g., hermetically sealed)
- a module that is corrosion resistant and can operate in temperatures from −40 F to 115 F.
- ability to store and transmit only when the network connectivity is available
- ability to associate information with unique bar identity
- a touch sensitive screen based on but not limited to resistor or capacitive sensor
- mechanism which allows for one touch reordering (e.g., a screen associated with the sensor device or an independent of the sensor device as an independent screen or button)
- the sensor module, pourer and spout could be combined into single unit or the pourer and spout could be independent of the sensors and processor module
- impellers, flow restrictive mechanisms and any additional conduits that attach to the sensor device can also be attached with a sensor
- a hollow wedge configured to be resizable to fit a neck size of a container bottle
- an electronic or physical label to allow differentiation of different sensor devices (e.g., based on the type of beverage, content, brand, etc.)
- a mechanical motor or other mechanism that can be utilized to clean a tip of a spout (e.g., cleaned using suction or air pressure)
- a mechanical or MEMS motor which could be attached to the sensor device so as to create a suctioning of air from within the bottle
- once air is sucked out, the sensor device functions to seal and block oxygen from entering the bottle
- a replaceable and/or rechargeable battery (e.g., battery may be recharged using inductive charging (e.g., Qi) and/or resonance wireless charging)

Interface Device 806 receives data from one or more sensor devices. For example, sensor device 804 broadcasts an identifier of an amount of content remaining in a container covered by sensor device 804 and interface device 806 receives the identifier for storage and processing. In some embodiments, sensor devices 802 and 804 each need to be configured for a specific type of container to allow each sensor device to be able to more accurately measure the amount of content remaining in a container engaged by the sensor device. For example, the waveform of the ultrasonic signal emitted by a sensor of the container cover is to be specifically configured for the shape/size of the container. In some embodiments, interface device 806 pairs with a sensor device (e.g., via a wireless Bluetooth connection) to transmit configuration data specific to the type of container associated with the sensor device. In some embodiments, a user utilizes interface device 806 to specify the type of container to be associated with a specific sensor device. In some embodiments, a user utilizes interface device 806 to view, manage, and/or configure one or more associated sensor devices. For example, a user utilizes an application of interface device 806 to configure sensor devices, view an inventory of remaining content measured by sensor devices, and automate ordering of low inventory content. Examples of interface device 806 include a mobile device, a smartphone, a smart watch, a wearable computer, a laptop computer, a desktop computer, and any other type of computer. In some embodiments, the interface device is also a charging station for one or more sensor devices. In some embodiments, a charging station includes a mechanism to sanitize a sensor device (e.g., via a suction cleaning, heating, blow drying, etc. mechanism).

In some embodiments, interface device 806 (e.g., base station) acts as a central communication hub for all sensor devices of a user within a certain proximity. In some embodiments, interface device 806 is associated with a specific user. Multiple interface devices may be utilized to manage the same set of sensor devices. For example, multiple interface devices may communicate with one another and/or with a backend server to synchronize data. In some embodiments, interface device 806 includes BLUETOOTH, BLUETOOTH Low Energy, and/or wireless (802.x) protocol-based wireless chipsets. In some embodiments, interface device 806 includes a display to display sensor device status, beverage quantity, recipes, order reminders, etc. In some embodiments, interface device 806 communicates with a Point of Sales (POS) system to correlate sales data with measured content utilization/consumption/depletion. In various embodiments, interface device 806 (e.g., base station) includes one or more of the following:
- display to inform the user about cap sensor device status, beverage quantity, recipes, reminders etc.
- a touch sensor or flashing LED based communicator to pair the cap sensor devices
- storage facility to store data from thousands of cap sensor devices for at least a month ability to communicate with a Point of Sales system ability to communicate with the cap sensor devices to collect the beverage volumes on demand ability to communicate with the cap sensor devices to suck oxygen out of the bottles Interface device 806 is connected to server 810 (e.g., backend server) by network 808. In some embodiments, server 810 remotely stores and/or processes measurement data received from sensor devices. For example, measurement data periodically broadcasted by sensor devices 802 and 804 is received by interface device 806 and interface device 806 provides the received data to server 810 for storage and/or backend server processing. In some embodiments, interface device 806 and/or server 810 utilizes measurement data of a sensor device to calculate an amount of content remaining in a container engaged by the sensor device. For example, a round trip signal reflection time measured by a sensor device is utilized to calculate a percentage fill amount of content remaining in a container. In some embodiments, server 810 processes current and/or historical content measurements to provide analytics (e.g., consumption pattern, determine inventory, analyze cost of goods sold, identify popularity trends, etc.) and inventory management solutions (e.g., inventory forecasting, inventory planning, automated inventory ordering, etc.).

In some embodiments, the system shown in FIG. 8 is utilized in a bar/restaurant environment to automatically track and manage inventory of liquor remaining in liquor bottles. Each liquor bottle is capped using a sensor device that is configured to be a cap for the liquor bottle. In some embodiments, the sensor devices detect the quantity of liquid/beverage remaining in each bottle and broadcast the detected quantity to interface device 806. The interface device reports the received quantity information to server 810. In some embodiments, server 810 provides an online interface to manage container content (e.g., beverage) inventory. For example, a bar/restaurant user entity may access server 810 via an application of interface device 806 and/or a webpage interface provided by server 810 to view and manage inventory of one or more tracked beverage products. Inventory information (e.g., including inventory remaining in open containers measured by sensor devices and full bottle inventory on hand in storage) may be updated automatically and viewed and exported in real time. The inventory of products may be classified by brands, drink type (tequila, whiskey, etc.), recipe (e.g., amount of each mixed drink able to be made using remaining inventory), and/or popularity. In various embodiments, the system provides one or more following functions:

mechanism to export or import the entire inventory of beverages classified by brands, drink type (tequila, whiskey etc.), recipe, and popularity a manual or automated process and technique of marking caps physically or through software identifiers for tracking each of the beverage listed in the inventory registering and identifying the base station per user In some embodiments, for a specific user account associated with one or more sensor devices, server 810 learns the consumption pattern, nutrients, and preferences in various types of beverages, flavors, taste, and brands. In some embodiments, using interface device 806, a user is able to access information about consumption quantity, humidity, oxygen content, inventory, drink recipes, and seasonal recommendations associated with current inventory detected using one or more sensor devices. In some embodiments, using interface device 806, a user may access a marketplace to order beverages from various distributors and delivery services. In some embodiments, a user is notified via interface device 806 a need to replenish an inventory of beverages and may also directly notify one or more distributors to place one or more appropriate orders. In some embodiments, interface device 806 provides recommendations for various drink recipes based on existing inventory detected using one or more sensor devices. In some embodiments, consumption data obtained across a plurality of different user entities may allow trend analysis and manufacturing forecasting across user entities.

In some embodiments, the sensor device includes a mechanism to control and limit an amount of beverage poured via a spout of the sensor device. In some embodiments, the sensor device includes a mechanism to evacuate oxygen out of a container and reseal the container. For example, in order to preserve the freshness of wine, the sensor includes an electronic air pump that pumps air out of a container. In some embodiments, the sensor device includes or has more sensors to detect temperature, humidity, acidity and/or nutrient value of content included in a container. The detected sensor information may be transmitted to an interface device and/or a server (e.g., interface device 806 and/or server 810). In some embodiments, a user is provided a notification when a detected content temperature and/or oxygen level is outside a recommended range.

One or more of the following may be included in network 808: a direct or indirect physical communication connection, mobile communication network, Internet, intranet, Local Area Network, Wide Area Network, Storage Area Network, a wireless network, a cellular network, and any other form of connecting two or more systems, components, or storage devices together. Additional instances of any of the components shown in FIG. 8 may exist. For example, server 810 may be a distributed server and/or may be connected to a plurality of interface devices. In another example, a plurality of interface devices may be utilized to manage and/or utilize the same or different container covers. In some embodiments, components not shown in FIG. 8 may also exist.

Figure 9:
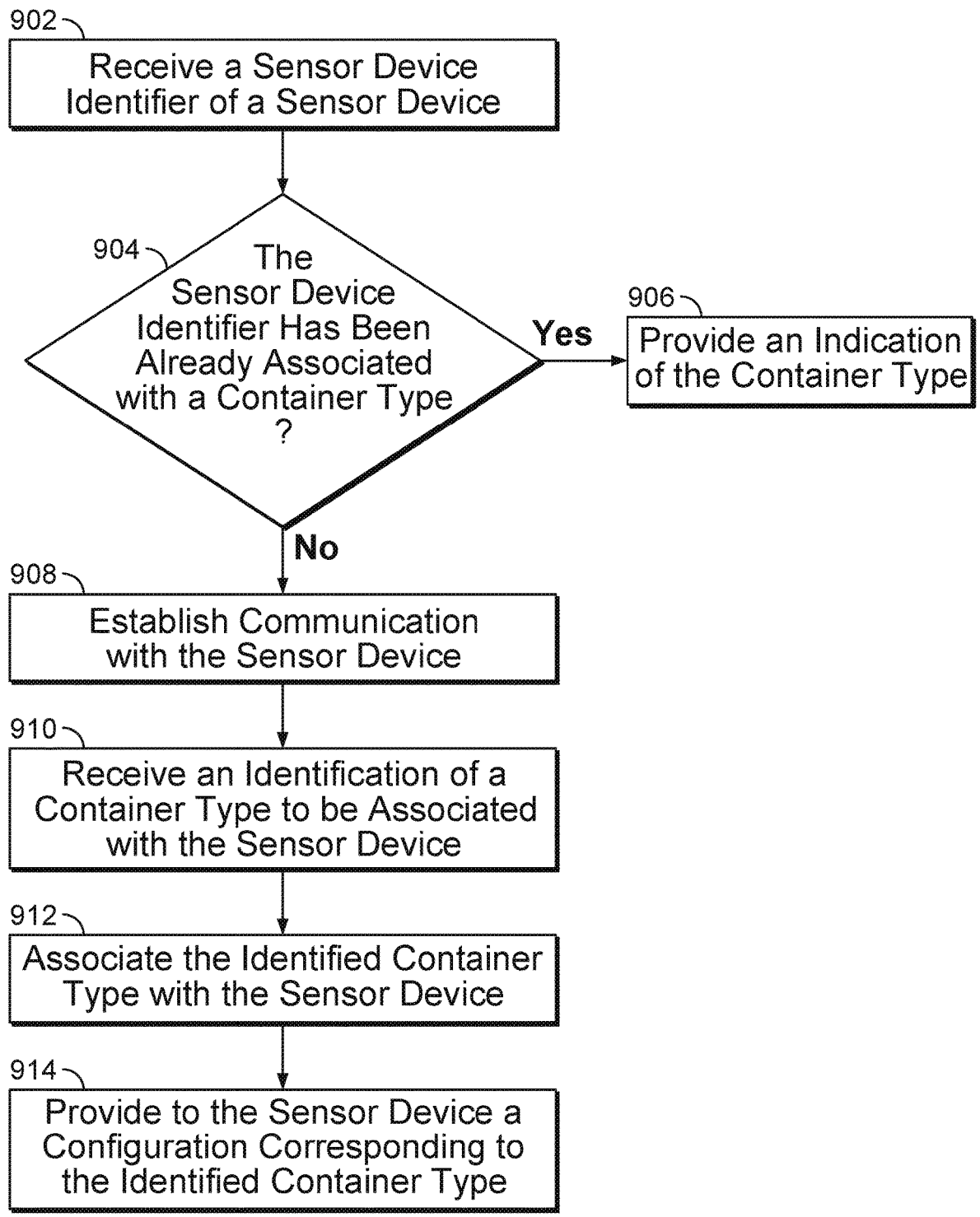
FIG. 9 is a flowchart illustrating an embodiment of a process for providing a configuration for a sensor device.

FIG. 9 is a flowchart illustrating an embodiment of a process for providing a configuration for a sensor device. The process of FIG. 9 may be implemented on interface device 806 of FIG. 8. In some embodiments, the sensor device measures an amount of content included in a container (e.g., sensor device is a bottle cap that measures amount of liquid remaining in a bottle capped by the sensor device) and the sensor device must be configured for a specific container type of the container for the sensor device to be able to more accurately measure the amount of content in the container. For example, various types of containers are shaped differently and the best waveform of the signal utilized to measure the amount of content included in a container may depend on the shape of the container. In some embodiments, in order to achieve consistent and accurate measurements, gain at various depths is varied to help increase the received signal strength. Gain can be varied by changing the frequency and the number of pulses. For example, higher frequency and lower number of pulses may lead to better resolution at the top of the bottle/container while lower frequency and higher number of pulses may lead to better resolution towards the bottom of the bottle/container (e.g., the act of changing the pulses and frequency is akin to organ pipe tuning). Bottles and containers may have dead zones where no measurements can be obtained due to standing waves. By continuing to pulse or use large number of pulses at the same frequency, the dead zones may be overcome. In some embodiments, a depth measurement provided by the sensor device is translated to a volume and/or percentage measurement value using a shape/volume profile of the container type associated with the sensor device. In some embodiments, the process of FIG. 9 is initiated when a user initiates a sensor device configuration process using an interface device.

At 902, a sensor device identifier of a sensor device is received. In some embodiments, the sensor device is sensor device 100 and/or 200 of FIGS. 1-7C. In some embodiments, the sensor device is sensor device 802 or 804 of FIG. 8. In some embodiments, the sensor device identifier has been wirelessly transmitted by the sensor device. For example, the sensor device broadcasts a unique identifier of the sensor device using a BLUETOOTH (e.g., BLUETOOTH low energy), WiFi, and/or other local or short range wireless communication protocol/signal. In some embodiments, receiving the sensor device identifier includes listening for a signal from a desired type of device (e.g., listen for a signal that is identified as sent by a sensor device). In some embodiments, the sensor device identifier is received via a wired connection. In some embodiments, the sensor device identifier has been transmitted by the sensor device in response to a user indication to the sensor device. For example, when a button on the sensor device is pressed for at least a threshold period of time, the sensor device transmits the sensor device identifier.

At 904, it is determined whether the sensor device identifier has been already associated with a container type. For example, the sensor device has been previously configured for a specific container type at 914 of FIG. 9. In some embodiments, a user desires to know which container type has been already associated with the sensor device. For example, a user may have a plurality of sensor devices that have been each already configured for and capped on a specific type of container. The user may need to remove all of the sensor devices from their associated containers to wash the sensor devices. For example, certain food service health codes may require restaurants/bars to periodically wash bottle cap spouts and sensor devices are configured as bottle cap spouts. However, because each sensor device has been configured for a specific container, once the sensor devices have been washed, the sensor devices may need to be returned back to the correct specific type of container associated with each sensor device. Although one alternative is reconfiguring each sensor device after being washed, the process of reconfiguring each sensor device may be inefficient and cumbersome to perform after each wash as compared to simply returning each sensor device back to the correct specific type of container.

In some embodiments, determining whether the sensor device identifier has been already associated with a container type includes determining whether a storage structure (e.g., table, database, list, etc. stored locally at an interface device and/or remotely at a backend server) includes an entry associating the sensor device identifier with the container type. In some embodiments, determining whether the sensor device identifier has been already associated with a container type includes analyzing information received from the sensor device. For example, the sensor device provides data indicating that the sensor device has been already associated with a container type and configured for the container type.

If at 904 it is determined that the sensor device identifier has been already associated with a container type, at 906, an indication of the container type is provided. For example, an identifier of the container type is displayed on a screen of an interface device to allow a user to return the sensor device back to the container that is of the displayed type. In some embodiments, an indication of the last determined remaining content amount/level determined using the sensor device is provided. For example, there may exist a plurality of containers of the same type and using the content amount/level information, the user is able to return the sensor device back to the identified container type with the identified content level. In some embodiments, an indication is received from a user to reconfigure the sensor device and the process proceeds to 908 (not shown). For example, although the sensor device has been already associated with a container type, a user desires to associate the sensor device with a different container type and the user presses a button on the sensor device to reconfigure the sensor device.

If at 904 it is determined that the identifier has not been already associated with a container type, at 908, communication is established with the sensor device. For example, a wireless communication channel is established. In some embodiments, a BLUETOOTH connection is established. For example, the sensor device is paired with an interface device and the sensor device enters into a paired communication mode.

At 910, an identification of a container type to be associated with the sensor device is received. In some embodiments, the container type identifies a type of container to be covered/capped/engaged by the sensor device. For example, an identification of the specific beverage bottle type to be capped by the sensor device is received.

In some embodiments, the container type identification is received via a user indication. For example, a user selects the container type from a list of container types. In some embodiments, receiving the container type includes receiving an identification of a product and/or packaging to be engaged with the sensor device. For example, a user indicates a product (e.g., liquor product in a specified packaging) to be engaged with the sensor device. In some embodiments, there exists a database of container types for various types of commercially sold beverage packages and the database is utilized to determine a corresponding container type to a user identification of a product.

In some embodiments, receiving the identification of the container type includes receiving a camera image. For example, using a camera of an interface device, a user captures an image of at least a portion of the container to be associated with the sensor device and the image (e.g., an image of a label on a product packaging) is analyzed to automatically determine the container type of the container.

In some embodiments, receiving the identification of the container type includes receiving a barcode/product identifier associated with the container type. For example, using an interface device, a user captures an image of a barcode (e.g., UPC barcode) on the product container to be associated with the sensor device and the image is analyzed to read the barcode identifier of the container. In some embodiments, a container type corresponding to the barcode identifier is identified. For example, the barcode identifier is utilized to search a database that includes entries that associate barcode identifiers with corresponding container types. In some embodiments, the barcode identifier is provided to a server and the server provides a corresponding container type identifier. In some embodiments, there exists a plurality of containers types associated with a barcode/product identifier and a user provides an indication to indicate the specific container type among the plurality of container types associated with the sensor device.

In some embodiments, the sensor device measures a distance between the sensor device and a level of liquid remaining in a container to determine the liquid fill level.

For example, a transmitter of the sensor device sends out a signal (e.g., ultrasonic signal) that gets reflected by the surface of the liquid in the container. The reflected signal is detected by a receiver of the sensor device. By measuring the amount of time it took to receive the reflected signal, the distance traveled by the signal before being reflected (e.g., distance between sensor device and liquid surface is half of the total distance traveled by the signal) may be determined by multiplying the amount of time by the speed of the signal (e.g., speed of sound).

In order to correctly determine the amount of content included in the container from the distance information, various parameters of the container must be known. For example, the height of the interior of the container and variations of the cross sectional volume/area of the container across the various depths of the container are needed to calculate the amount/percent of content left in the container. In one example, if the total distance between the bottom of the container and the sensor device is known, the fill height of the container can be determined (e.g., total distance between the bottom and the sensor device minus distance between the sensor device and liquid surface). If the shape and volume of the container are known, the volume of liquid contained in container 102 may be determined. In some embodiments, the container type identification is utilized to obtain a formula/table/database/data structure that maps a measured distance (e.g., fill height, height between liquid surface and sensor device, etc.) to a corresponding remaining content volume/percentage for the specific container type.

At 912, the identified container type is associated with the sensor device. In some embodiments, associating the container type with the sensor device includes storing a data entry (e.g., in a database) that associates the container type with the sensor device identifier. For example, a database of associations between various sensor device identifiers and corresponding associated container types are maintained at an interface device (e.g., device 806 of FIG. 8) and/or a backend server (e.g., server 810 of FIG. 8). This database may also be utilized to store determined content volume/level of containers being tracked by the various sensor devices.

At 914, a configuration corresponding to the identified container type is provided to the sensor device. In some embodiments, a sensor device configuration specific to the identified container type is obtained and provided to the sensor device for configuration. For example, the sensor device needs to be configured for a specific type of container type to enable the sensor device to more accurately measure the amount/level of content remaining in a container. In some embodiments, the configuration corresponding to the identified container type is provided via a communication established with the sensor device in 908.

In some embodiments, the sensor device includes a transmitter for transmitting a signal and a receiver for receiving the signal that has been reflected. The parameters of the signal being transmitted may need to be configured specifically for the container that holds the content to be measured. For example, in order to reduce undesired reflections within the container, the transmitted signal is generated based on the parameters specifically configured for the specific container type. In some embodiments, the configuration specifies a waveform/shape of a signal (e.g., frequency of a signal component, a length of a signal component, profile of a signal component, content of a signal component, etc.). For example, the signal includes one or more component signal pulses and the configuration specifies the shape/waveform of each signal pulse. In some embodiments, the configuration specifies a number of signal pulses to be transmitted sequentially to measure a content amount/level of a container. In some embodiments, by varying the frequency and number of waves helps create a resonance with the microphone under various heights in different bottles. In some embodiments, the configuration specifies a configuration of a receiver of the sensor component. For example, a type and/or a parameter of one or more signal filters to be utilized to filter a received reflected signal is specified by the configuration.

Figure 10:
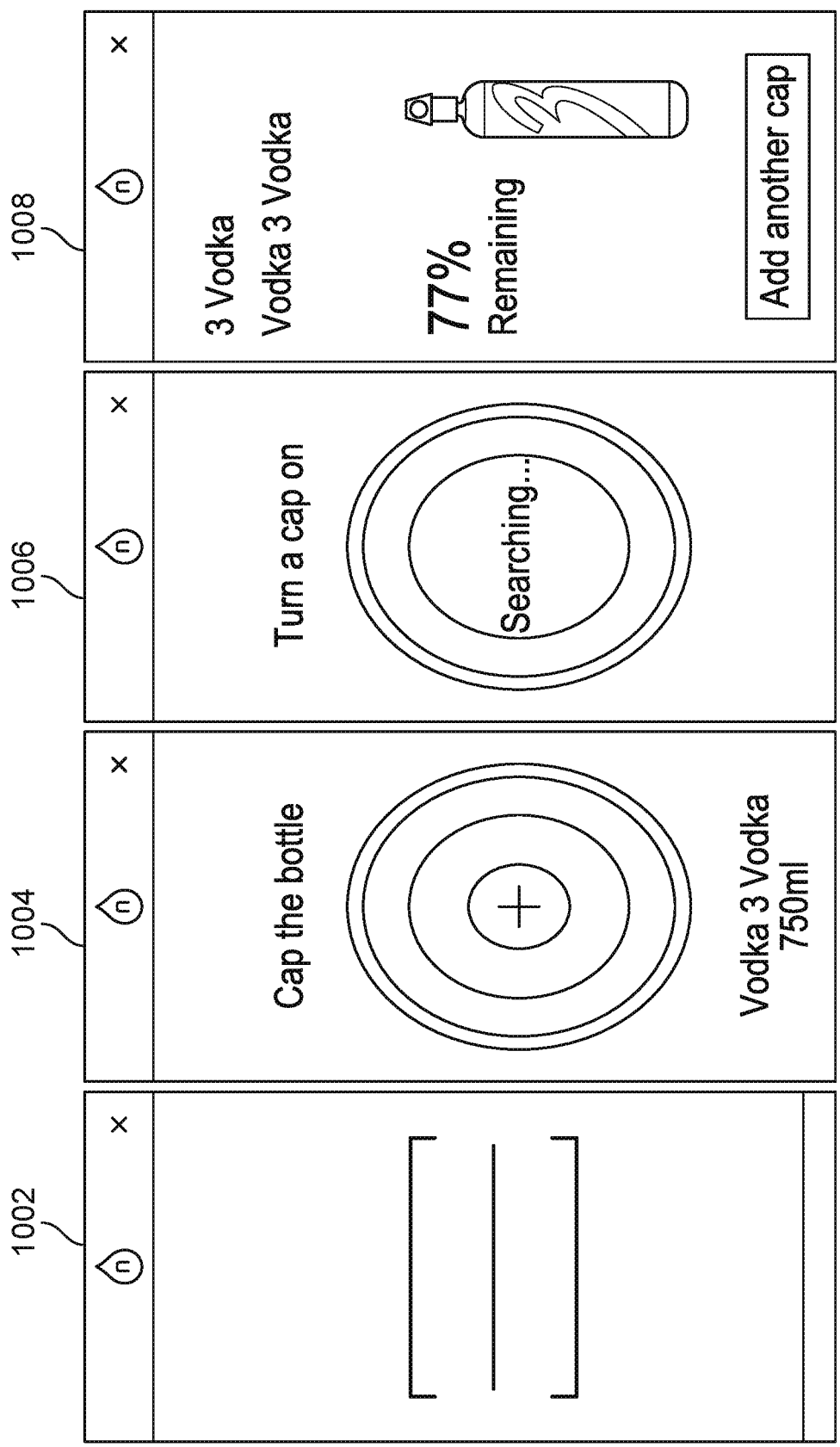
FIG. 10 is a diagram illustrating an embodiment of a user interface for specifying a container type to be associated with a sensor device.

FIG. 10 is a diagram illustrating an embodiment of a user interface for specifying a container type to be associated with a sensor device. In some embodiments, the interface of FIG. 10 is provided on interface device 806 of FIG. 8. In some embodiments, the interface of FIG. 10 is utilized to provide the container type received in 910 of FIG. 9.

Interface screen 1002 shows a viewfinder display of a live camera image. Using the displayed viewfinder, a user is to capture an image of a barcode printed on a product container. For example, when a barcode is captured within the shown bracket guidelines, the barcode is read and analyzed to determine whether it is a known barcode that corresponds to a particular container type. Once a valid barcode has been detected, the interface progresses to interface screen 1004. In the example shown, interface screen 1004 confirms that the barcode has been detected to correspond to container type "3 Vodka 750 ml" that holds vodka contents. A user is instructed to place a sensor device on the container holding the contents to be measured. Once the sensor device has been engaged with the container, a user is to select the "+" icon and the interface progresses to interface screen 1006. The user is instructed to turn on the sensor device (e.g., by pressing a button on the sensor device for at least a specified period of time, the sensor device turns on and broadcasts its identifier) and the interface device attempts to detect the sensor device (e.g., listens for a new BLUETOOTH LE signal from a sensor device). When the sensor device has been detected, a connection is established with the sensor device (e.g., communication established at 908 and configuration provided in 914 of FIG. 9) and content amount/level of the container is detected. The interface progresses to interface screen 1008 where the container type, a representative image of the product, and the latest detected remaining content amount/level (e.g., percentage remaining) is displayed.

Figure 11:
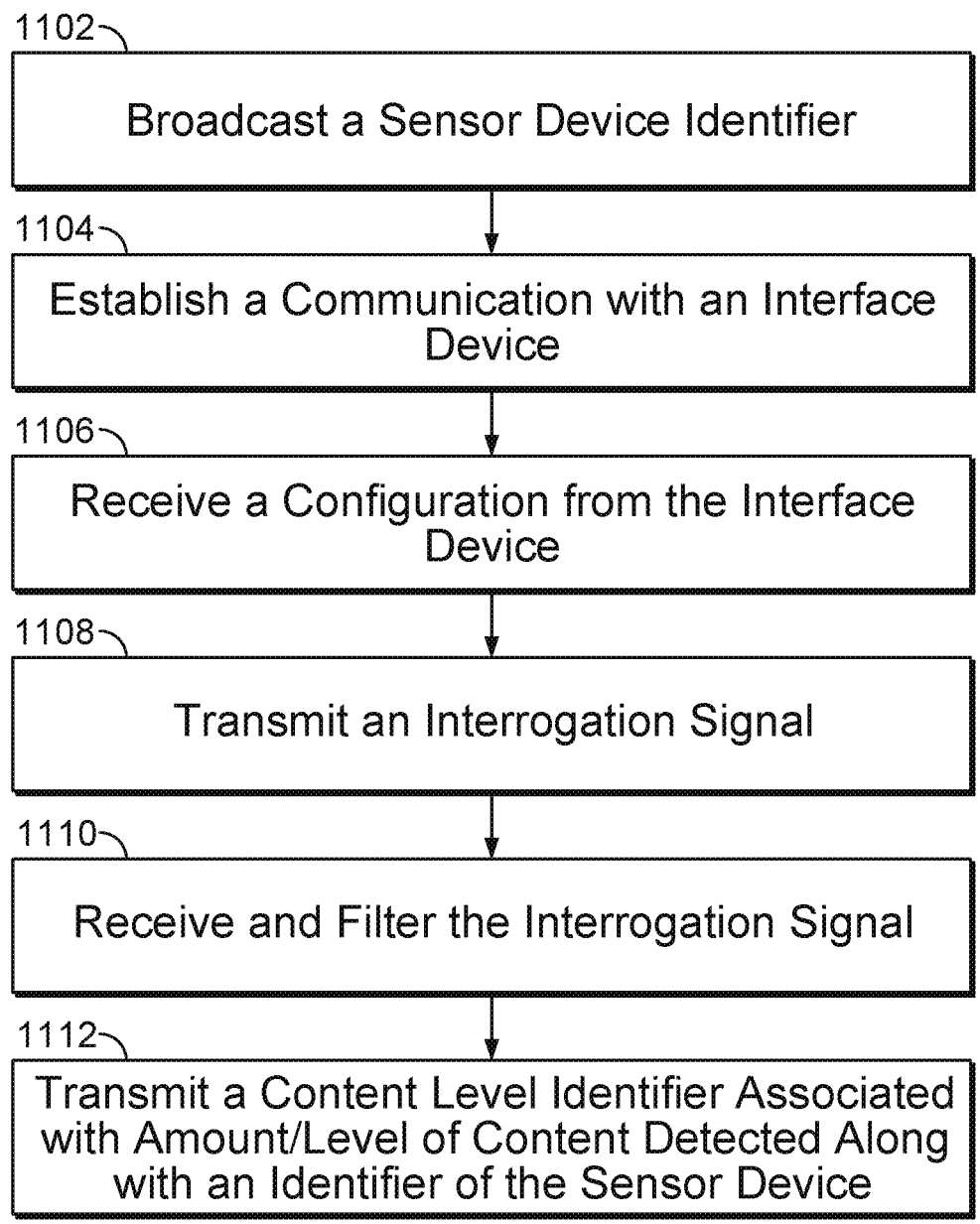
FIG. 11 is a flowchart illustrating an embodiment of a process for configuring a sensor device.

FIG. 11 is a flowchart illustrating an embodiment of a process for configuring a sensor device. The process of FIG. 11 may be implemented on sensor devices 802 and/or 804 of FIG. 8.

At 1102, a sensor device identifier is broadcasted. In some embodiments, the sensor device identification is the identification received at 902 of FIG. 9. In some embodiments, the sensor device identifier is transmitted in response to entering a pairing mode of the sensor device. For example, the sensor device enters a BLUETOOTH pairing mode to advertise availability of the sensor device for paring. In some embodiments, the sensor device identifier is broadcasted in BLUETOOTH advertising/beacon mode. In some embodiments, a sensor device is first operated in paired mode (e.g., Generic Attribute Profile (GATT) client/server) then switched to advertising/beacon mode. In some embodiments, the sensor device identifier is broadcasted in response to an engagement of a button of the sensor device. For example, when a user presses a button on the sensor device for at least a threshold amount of time, the sensor device enters into a mode that broadcasts the sensor device identification.

At 1104, a communication with an interface device is established. In some embodiments, establishing the communication includes establishing the communication established in 908 of FIG. 9. In some embodiments, a BLUETOOTH connection is established. For example, the sensor device is paired with an interface device and the sensor enters into a paired bidirectional communication mode.

At 1106, a configuration is received from the interface device. In some embodiments, the received configuration is the configuration provided in 914 of FIG. 9. In some embodiments, the configuration specifies one or more parameters of an interrogation signal that is to be reflected off contents within a container to measure an amount and/or level of content included in the container. In some embodiments, the configuration specifies one or more parameters of a filter to apply to a received reflected interrogation signal. In some embodiments, the configuration includes an identifier of a profile that has been already stored in a data storage of a sensor device.

At 1108, an interrogation signal is transmitted. In some embodiments, the transmitted interrogation signal is generated using the received configuration. For example, the interrogation signal includes one or more signal pulse components. For example, each signal pulse may be identical and the signal pulses are emitted sequentially with an optional period of no signal (e.g., silence) between the signal pulses. The number of signal pulses, the length of the signal pulses, a frequency of the signal pulses, a signal content of the signal pulses, a strength/magnitude of the signal pulses, a profile of the signal pulses, a waveform of a signal pulse, and/or a length of null signal between the signal pulses may be specified by the received configuration. The variations of the interrogation signal may be due to the type of container that is holding the content to be measured. For example, the thickness of the container, the material of the container, a shape of the container, a length of the container, a width of the container, a size of the container, and/or the content included in the container may all affect how and where the interrogation signal travels and bounces within the container and the received configuration is specific to the container type of the container to improve the content amount/volume/level measurement of a sensor device.

In some embodiments, by measuring the amount of time it takes for the interrogation signal to travel from a sensor device engaged at the top of the container to content (e.g., liquid) remaining within the container and reflect back to the sensor device, the distance traveled by the interrogation signal before being reflected (e.g., distance between sensor device 100 and liquid surface is half of the total distance traveled by the signal as shown in FIG. 1) may be determined by multiplying the amount of time by the speed of the signal (e.g., speed of sound when the interrogation signal is an ultrasonic signal). If the total distance between the bottom of the container and the sensor device is known, the fill height of the container can be determined (e.g., total distance between bottom and sensor device minus distance between sensor device and content surface). If the shape and volume of the bottle are known, the volume/amount of content contained in the container may be determined.

At 1110, the interrogation signal is received and filtered. In some embodiments, to determine the amount of time it took to receive the reflected interrogation signal, the received reflected interrogation signal is filtered to isolate the desired signal (e.g., band-pass filter the received signal), amplified, and analyzed to detect peaks that correspond to when the reflected signal was received. The received configuration may specify the parameters/configuration of the filter, amplification, analysis, isolation, etc. In some embodiments, a predetermined beginning portion (e.g., predetermined amount of time in the beginning of the signal) of the received signal may be ignored when analyzing the signal to ignore signals that were detected due to coupling between the transmitter and receiver of the sensor device. For example, when the transmitter transmits the signal, the signal may be received by the receiver of the sensor device (e.g., conducted through the sensor device, due to undesired reflection, etc.) before the signal is reflected by the contents of the container, and the undesired received signals received in the beginning portion of the received signal are ignored when identifying the desired received reflected signal. In some embodiments, parameters of the predetermined beginning portion (e.g., amount of time) are specified by the received configuration.

At 1112, a content level identifier associated with the amount/level of content detected is transmitted along with an identifier of the sensor device. For example, the content level identifier includes a time value associated with the amount of time it took to receive the reflected interrogation signal and/or a distance value associated with the distance traveled by the received reflected interrogation signal. In another example, the transmitted content includes a packet and the packet includes a Mac ID, depth value (e.g., in mm), temperature value (e.g., in F), amount of power left (e.g., in seconds), and a real time clock value (e.g., 32 bit value). In some embodiments, the transmission is performed if it is determined that depth has changed and the transmission is not performed (e.g., shut off) if it determined that depth has not changed. In some embodiments, the sensor device is able to store the data to be transmitted and transmit only when network connectivity is available.

In some embodiments, the identifier of the sensor device is the sensor device identifier broadcasted in 1102. In some embodiments, the content level identifier and the identifier of the sensor device are broadcasted. For example, the content level identifier and the identifier of the sensor device are broadcasted within a BLUETOOTH Low Energy advertisement packet (e.g., single directional communication of an advertisement/beacon mode). By broadcasting the data one-way rather than transmitting the data via a BLUETOOTH paired bidirectional connection, power saving may be achieved due to the lower power requirements of the BLUETOOTH Low Energy advertisement broadcasting as compared to BLUETOOTH Low Energy paired bidirectional communication. In some embodiments, an interface device may be limited to a maximum number of concurrent paired mode communications while the interface device is able to receive a significantly larger number of advertisement packets from different sensor devices. For example, by utilizing BLUETOOTH Low Energy advertisement broadcasting, a single interface device is able to receive data from a larger number of sensor devices as compared to utilizing BLUETOOTH Low Energy paired bidirectional communication.

In some embodiments, the latest determined content level identifier and the identifier of the sensor device are broadcasted periodically. For example, after 1112, the process returns to 1108 at a periodic interval. In some embodiments, the latest determined content level identifier and the identifier of the sensor device are broadcasted dynamically. For example, after 1112, the process returns to 1108 when a dynamic condition has been met (e.g., when a movement/motion sensor (e.g., accelerometer) on the sensor device has detected movement).

Figure 12:
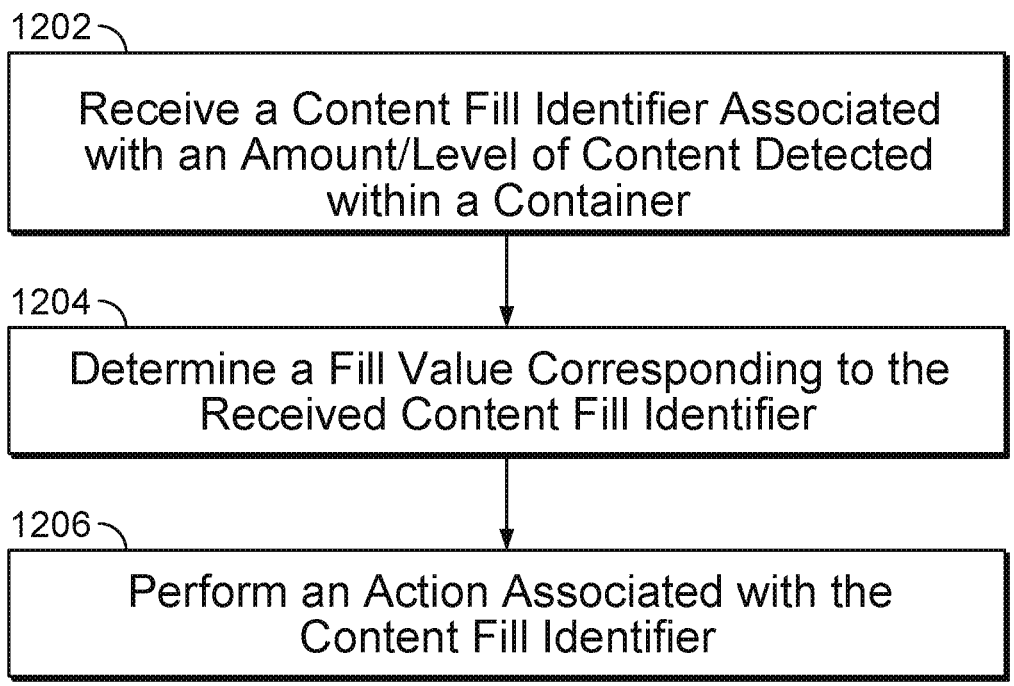
FIG. 12 is a flowchart illustrating an embodiment of a process for performing an action based on a determined content amount.

FIG. 12 is a flowchart illustrating an embodiment of a process for performing an action based on a determined content amount. The process of FIG. 12 may be at least in part implemented on interface device 806 and/or server 810 of FIG. 8.

At 1202, a content fill identifier associated with an amount/level of content detected within a container is received. In some embodiments, the received content fill identifier was transmitted in 1112 of FIG. 11. In some embodiments, the content fill identifier has been received along with an associated sensor device identifier of a specific sensor device. The content fill identifier may be utilized to track change in content amount/level of a specific container measured by a sensor device. In some embodiments, the content fill identifier has been received via a local wireless communication protocol (e.g., Wifi, BLUETOOTH Low Energy, etc.). In some embodiments, the content fill identifier is received by interface device 806 of FIG. 8. In some embodiments, the content fill identifier is received by server 810 via network 808 of FIG. 8. In various embodiments, the received content fill identifier is one of a plurality of content fill identifiers received from the same sensor device over time for the same container and/or from different sensor devices for different containers. In some embodiments, the content fill identifier includes a time value associated with the amount of time it took to receive the reflected interrogation signal and/or a distance value associated with the distance traveled by the received reflected interrogation signal.

At 1204, a fill value corresponding to the received content fill identifier is determined. For example, a percentage value and/or a volume amount value corresponding to the received content fill identifier is determined. In some embodiments, using an identifier of a sensor device associated with the received content fill identifier, a container type associated with the received content fill identifier is identified. For example, the identification of a specific container type received in 910 of FIG. 9 has been previously associated with the sensor device identifier and this identification of the container type is retrieved using the sensor device identifier. In some embodiments, the sensor device identifier and the received content level identifier are provided to server 810 by interface device 806 and server 810 determines the corresponding fill amount/level. In some embodiments, the received content fill identifier identifies the associated container type of the sensor device that transmitted the received content fill identifier.

In some embodiments, a specific container type is associated with a specific table/database/data structure/formula that maps an identifier of the received content fill identifier to an amount/level of content included in a container of the associated container type. For example, the fill percentage and/or volume value that corresponds to the received content fill identifier is determined. In some embodiments, the received content fill identifier is modified before being utilized to obtain the amount/level value using the specific table/database/data structure/formula for the specific container type.

At 1206, an action associated with the content fill identifier is performed. For example, the determined fill value is stored. For example, server 810 of FIG. 8 tracks content remaining within each container being tracked using one or more sensor devices. In some embodiments, performing the action includes performing inventory management. For example, an inventory of a liquor beverage remaining in an opened bottle as well as new bottle stocked on hand are tracked to provide reporting of consumption amount, cost of goods sold, consumption pattern, inventory forecasting, etc.

In some embodiments, performing the action includes providing an alert when it is detected that inventory of the content is low. For example, a mobile application alert on an interface device is provided when the amount/level of content reaches below a threshold value for a single container and/or an inventory across all inventory on hand of the content. In another example, the alert is provided on the sensor device (e.g., flashing light). In some embodiments, the alert is only provided if the amount/level of content reaches below a threshold value. The threshold value may be dynamically determined based on historical depletion pattern of the content. In some embodiments, an interface device application and/or a webpage is utilized to display and manage inventory of content.

In some embodiments, a database tracks remaining content in each container measured by a sensor device, and for each tracked content stores one or more of the following: sensor device identifier, type of liquid, brand of product, UPC, bar code identifier, quantity remaining, quantity utilized over a time period (e.g., minute/day/week/month/year, etc.), new product container/bottle on hand, price, distributor, date and time of purchase, servings per use, time of servings consumed, location, expiration, chemical composition, odor, color, temperature, humidity, ingredients of the content, and various content composition information (e.g., sulfites, ethyl, etc.). In some embodiments, once sufficient fill values are collected over time, performing the action includes determining a recommended time to reorder, a rate of consumption, an average amount consumed per pour/usage, etc. In some embodiments, a user is able to establish and specify one or more inventory thresholds based on product category, brand, type of beverage, cost, and/or recipes. For example, when the inventory of a product falls below a threshold, a notification may be provided in real-time.

In some embodiments, performing the action includes determining whether the latest determined fill value is larger than a previously determined fill value detected using the same sensor device. For example, it is assumed that containers are not refilled with contents and when contents of a container has been entirely consumed, a user is to replace the empty container with a new full container of the same container type and transfer the sensor device from the empty container to the new full container. The use of a new product container is automatically determined and tracked by detecting whether the latest determined fill value is larger than a previously determined fill value. In some embodiments, if a user desires to utilize a different container type with a sensor device that has been already associated with an existing container type, the user is to reconfigure the sensor device for the new container type.

In some embodiments, performing the action includes obtaining Point of Sale data of items (e.g., mixed drinks, shots, glasses, etc.) sold and correlating the POS data with tracked content inventory depletion. This may offer a view into which types of beverages are in demand, how beverages are consumed, and pairing between different products (e.g., food pairing). Based on this information, a user entity profile may be developed to enable insights into past performance and future forecasting of the user entity's sales metrics. In some embodiments, by analyzing consumption patterns across user entities, geographical regional analysis may be performed to analyze product trends. This information may be utilized to provide recommendations on items to offer for sale based on seasonality, real-time consumption data, and trends for a particular geographical area as well as across a larger region.

In some embodiments, a recipe (e.g., mixed drink recipe) is recommended based on inventory availability of ingredients (e.g., determined amount/level of content), season, consumer profile, holidays, social recommendations, etc. For example, a recipe recommendation service detects the availability of ingredient beverages in real-time, analyzes applicable seasonal/time-based demand profiles of recipes, and suggestions from consumers to recommend the best possible drink recipes to offer. In some embodiments, based on current recipes offered by a user entity and/or new recipes to be offered by the user entity, inventory forecasting is adjusted to provide a recommendation of additional quantities of products/containers to order from one or more distributors. For example, when a new recipe is added, the missing ingredients and/or low inventory ingredients are automatically ordered from the most appropriate distributors (e.g., distributors/merchants selected based on price) in quantities that have been forecasted based on detected product content depletion patterns of the user entity as well as for other user entities (e.g., similar user entities that have already offered the new recipe).

In some embodiments, performing the action includes assisting in ordering additional quantities of the content being tracked. For example, the consumption amount and pattern of the content and amount of full product containers on hand are analyzed to determine how many additional containers of the content should be ordered to replenish the stock inventory of the container. In some embodiments, the order for additional product containers may be automatically provided to a distributor/merchant of the product container to automatically place an order for the content. For example, a user is provided an option to reorder a product from a distributor by allowing the user to automatically send inventory reports periodically to the distributor. In some embodiments, a notification to order additional quantities of a product/content is provided to a user and the user may provide an associated confirmation to automatically place an order for the recommended additional quantities of the product/content from a recommended/preset distributor. Order configuration such as distributor preference, payment information, preferred time of delivery, etc. may be stored and utilized when automatically placing an order.

In some embodiments, a product marketplace with various distributor/merchant options for products is accessible via an interface device such as interface device 806 of FIG. 8. In some embodiments, a device/server is able to locate a distributor's delivery truck or service that is nearby and automatically order/request delivery of one or more products/containers that are preferred to be restocked immediately. For example, when it is detected that additional quantity of a product is required prior to a normal product ordering/delivery schedule, immediate delivery from a nearby source is automatically requested. A user may be provided a notification prior to ordering/delivery to obtain authorization from the user.

Figure 13:
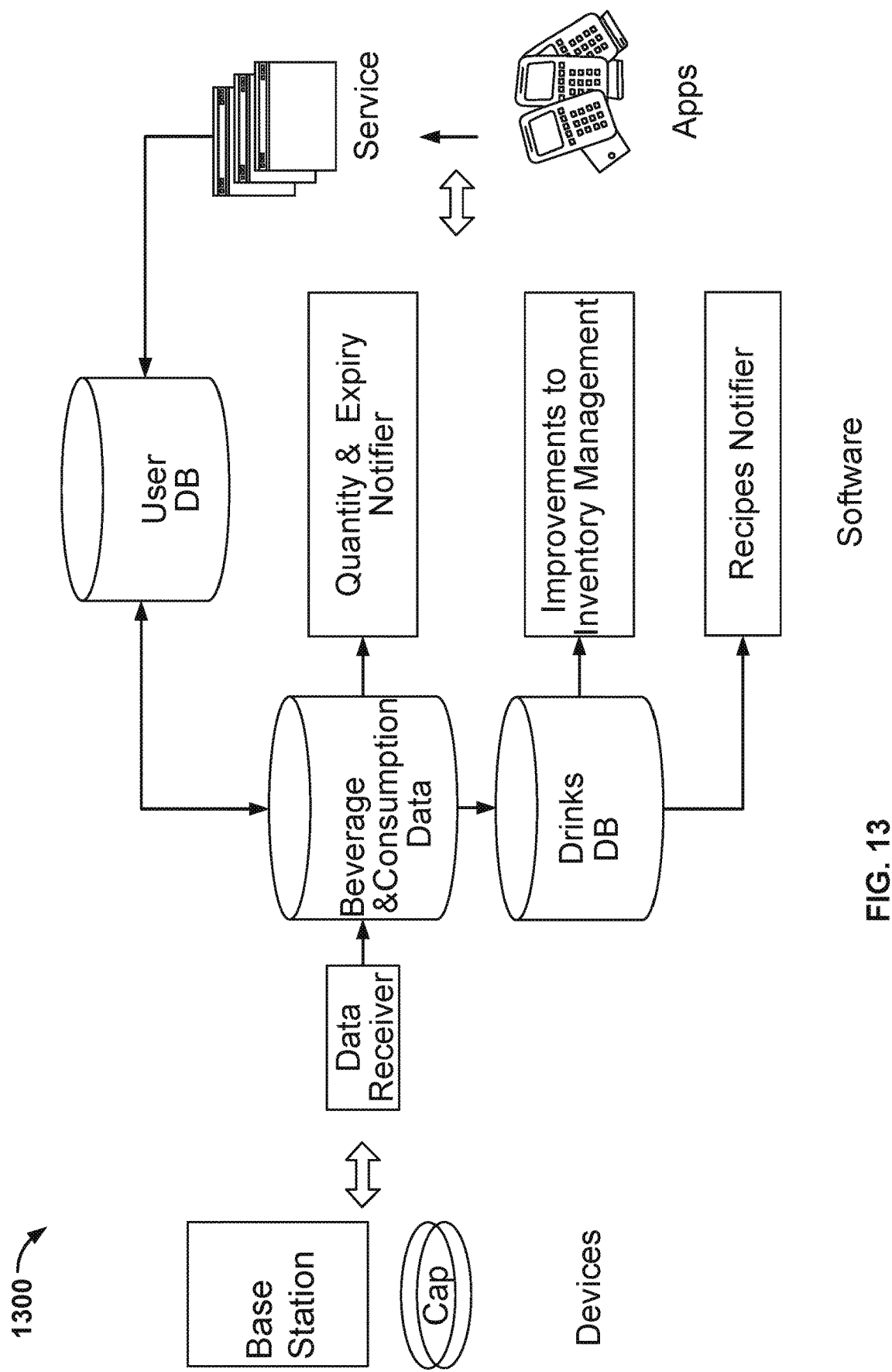
FIG. 13 is a diagram illustrating an embodiment of a system environment.

FIG. 13 is a diagram illustrating an embodiment of a system environment. System environment 1300 includes components of devices, software, services and applications.

One or more components of the system environment listens to all devices and collects data inputs (e.g., see FIG. 13). Each Cap and Base Station or any other device of the system environment is uniquely identified by a hardware identification number (ID). This ID is associated with a bar (the ID could be transferred and associated with a new bar).

Data inputs are associated with device ID and stored under the corresponding bar profile. The "data" includes but not limited to—beverage name, types of liquid, brand, UPC or bar code, quantity, price, distributor, date and time of purchase, servings per use, time of servings consumed, location, expiration, chemical composition, odor, color, temperature, humidity, ingredients used, and various nutrient amounts (e.g., Sulfites, ethyl, etc). Once sufficient samples are collected over a reasonable time (e.g., at least a few hundred) the software component(s) starts to "learn" the following patterns and habits including but not limited to—time to reorder and replenish, rate of consumption of a certain type of beverage, and average consumed amount consumed per pour/usage.

Based on the consumption patterns and learning, a notification is provided (e.g., to bar) about running out of beverages. Following the notifications, an option is given to reorder the beverage from a distributor. The user is given a choice to automatically send those reports periodically to their choice of distributor automatically.

In some embodiments, one or more the following functionalities are provided:

Storing beverage related "data" that offers a view into beverage consumption patterns by a service owners: beverage name, types of liquid, brand, UPC or a bar code, quantity, price, distributor, date and time of purchase, servings per use, time of servings consumed, location, expiration, chemical composition, odor, color, temperature, humidity, ingredients used, and various nutrient amounts (e.g., Sulfites, ethyl, etc.)

A mechanism to uniquely associate various devices that help collect beverage data with each user and their inventory The ability to listen, collect and store millions of devices at any given point in time Ability to notify the user to reorder the necessary beverages or automatically reorder and replenish from distributors Algorithm that mines, learns, and predicts amount of beverage needed by the user Ability for the bar to set beverage threshold levels upon which they are notified to reorder Ability to notify the bar when the beverage temperature is not ideal and the beverage needs more appropriate storage Ability to notify the bar when oxygen level in the bottles are beyond the threshold of permitted aeration levels Ability for the bar to set thresholds for inventory based on category, brands, type of beverage and recipes Notifications in realtime when the inventory levels fall below the threshold levels Recommendations to Improve Inventory Management and COGS In some embodiments, software will integrate with a system that offers content associated with each beverage. This can be done by either building a UPC and content database or integrating it with existing databases with similar information. Using such UPC and content database consumption of beverages in a bar can be tracked to various types of beverages and its content. Combining the POS data and the types of beverages sold, a view into which types of beverages are in demand, how is it consumed, and paired well with other products (food) offered can be provided. Based on this information a "Profile" can be developed for the User which offers insights into how the User business is operating in terms of beverage consumption, ordering, and future demand.

Based on the analysis of various beverage consumption patterns across the country regional analysis of beverage consumption can be offered. Such data could then be offered to various bars based on the geography to help them make informed choice on the beverages to be offered (which are in demand) which helps them maximizes their revenue.

In some embodiments, one or more the following functionalities are provided:

Ability to track the beverage consumption by content, brand, and various categorization per period (e.g., minute/day/week/month)

Ability to associate the sales of various types of beverages paired with the food by connecting to the POS in real-time Ability to build a "Profile" of a bar by combining the consumption pattern with the POS data Ability to aggregate beverage consumption patterns across various geographies Ability to make recommendations to the bar about possible way to maximize revenue by offering a certain type of beverage or recipe based on seasonality, consumption in real-time, and trends across the geography Consumption Patterns Drink recipes are based on various factors; availability of beverages, season, ethnicity, holidays, social recommendations etc. In some embodiments, components of the system environment (Devices, Software and Services) are uniquely positioned to capture and aggregate all of these requirements. The Recipe Recommendation service looks at the availability of beverages in real-time, checks the seasons, suggestions from friends and will recommend the bar the best possible drink recipes to offer (e.g., see FIG. 13). Alongside the recommendations notifications for ordering the missing drink are also sent to the bar.

In some embodiments, one or more the following functionalities are provided:

Real-time recipe recommendation based on availability of beverage owned by the consumer, various restrictions, age, season, ethnicity, holidays, social recommendations Notifications for ordering/re-ordering beverages that might be missing to offer a specific drink so it's delivered on time for serving (as specified by the user)

One Tap Beverage Reordering

In some embodiments, an application connects to the Software and Service shown in FIG. 13 to query for information related to the bar. The app then displays the beverage availability, various notifications such as reordering, inventory management tasks, recipe recommendations and profile of the User.

When a bar gets a notification to re-order a certain beverage they can tap on the notification and the beverage would be automatically delivered from the preferred or preset distributor. The order would be delivered to both the sales rep and the distributor's system.

One Tap Re-ordering may be made possible by aggregating several fragmented services in a unique manner. When the bar downloads the application or subscribes to the services, bar preference around distributor, payments, time of delivery are requested and gathered and stored within the Service. Once the reorder notification is tapped, series of these services are initiated in the background and the beverage is delivered on time at the preferred location without any further action from the bar.

In some embodiments, one or more the following functionalities are provided:

One tap beverage reordering that helps bar get the beverage delivered to their preferred location and preferred time without any further action.

A delivery services marketplace that offers the bar to choose from a host of delivery services.

A mechanism to locate a distributors delivery truck or service nearby and detect that the bar is running low on a specific beverage and deliver it immediately to the bar. The bar might be notified before it's delivered.

In some embodiments, an apparatus (e.g., combination of smart devices, cloud based software and services) is provided, through which the quantity of beverages remaining in each beverage bottle and amount consumed after each usage are automatically detected and notified in reals time. Beverages that need to be reordered are recommended based on various factors such as quantity remaining, consumption patterns, seasonal demand, distributor delivery times and existing inventory. Competing distributors are also checked to help lower the cost of goods. The consumption pattern can help detect any breakage, and spillage. A "Profile" is built by aggregating and learning information about beverage consumption over time within the bars. Profile helps improve the kinds of beverages that the bars should be offering and possible drink recipes for using the beverage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sensor device, comprising:
an interrogation signal transmitter configured to transmit an interrogation signal used to determine an identifier associated with an amount of content included in the container engaged by the sensor device, wherein the interrogation signal is one of a plurality of different options of interrogation signals each with a different shape and/or waveform that the sensor device is configured to transmit based on a sensor configuration, wherein the interrogation signal is configured according to a shape and/or a size of the container, and the interrogation signal transmitter is configured to transmit the interrogation signal that travels through air included in the container to reflect off the content in the container; and
a communication transmitter configured to wirelessly transmit the identifier associated with the amount of content included in the container.

2. The sensor device as recited in claim 1, wherein the interrogation signal transmitter is a transceiver and the transceiver is configured to receive the interrogation signal that has been reflected off the content included in the container.

3. The sensor device as recited in claim 2, wherein the received interrogation signal is filtered based at least in part on the received sensor configuration.

4. The sensor device as recited in claim 1, wherein the sensor device is a bottle cap of the container.

5. The sensor device as recited in claim 1, wherein the sensor device includes a spout.

6. The sensor device as recited in claim 1, wherein the amount of content is an amount of liquid.

7. The sensor device as recited in claim 1, wherein the sensor configuration is associated with the content included in the container.

8. The sensor device as recited in claim 1, wherein the sensor configuration is specific to a container type of the container.

9. The sensor device as recited in claim 1, wherein the communication transmitter transmits the identifier associated with the amount of content using a wireless personal area network advertisement packet.

10. The sensor device as recited in claim 1, wherein the sensor configuration specifies the shape and/or the waveform of the interrogation signal.

11. The sensor device as recited in claim 1, wherein the different shapes and/or waveforms of the interrogation signal options include different signal amplitudes.

12. The sensor device as recited in claim 1, wherein the interrogation signal transmitter is further configured to transmit another one of interrogation signal from the plurality of different options of interrogation signals.

13. A system, comprising:
a communication receiver configured to receive a sensor device identifier from a sensor device; and
a processor coupled with the communication receiver and configured to:
associate the sensor device identifier with a container; and
provide a sensor configuration to the sensor device, wherein the sensor configuration is utilized by the sensor device to determine a fill identifier associated with an amount of content included in the container engaged by the sensor device, wherein the sensor device is configured to transmit an interrogation signal, the interrogation signal is one of a plurality of different options of interrogation signals each with a different shape and/or waveform that the sensor device is configured to transmit, wherein the interrogation signal is configured according to a shape and/or a size of the container, and the interrogation signal transmitter is configured to transmit the interrogation signal that travels through air included in the container to reflect off the content in the container.

14. The system as recited in claim 13, wherein receiving the identification associated with the container type includes receiving an image of a barcode of the container.

15. The system as recited in claim 13, wherein the processor is further configured to receive the fill identifier and determine a fill value corresponding to the fill identifier for the container type.

16. The system as recited in claim 15, wherein the processor is further configured to provide a notification in the event the fill value is below a threshold.

17. The system as recited in claim 15, wherein the processor is further configured to automatically place an order for the content in the event the fill value is below a threshold.

18. The system as recited in claim 13, further comprising a storage configured to track an inventory for the content included in the container.

19. The system as recited in claim 13, wherein the processor is further configured to analyze a historical depletion pattern of the content and determine a quantity of the content to reorder.

20. The system as recited in claim 13, wherein the processor is further configured to analyze a depletion pattern of the content across a plurality of sensor devices of a plurality of user entities.

* * * * *